US012351731B2

(12) United States Patent
Rabnawaz et al.

(10) Patent No.: US 12,351,731 B2
(45) Date of Patent: Jul. 8, 2025

(54) METHODS FOR FORMING OMNIPHOBIC THERMOSET COMPOSITIONS AND RELATED ARTICLES

(71) Applicant: BOARD OF TRUSTEES OF MICHIGAN STATE UNIVERSITY, East Lansing, MI (US)

(72) Inventors: Muhammad Rabnawaz, East Lansing, MI (US); Fahad Khan, East Lansing, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 758 days.

(21) Appl. No.: 17/581,066

(22) Filed: Jan. 21, 2022

(65) Prior Publication Data

US 2022/0145088 A1   May 12, 2022

Related U.S. Application Data

(63) Continuation of application No. 16/486,902, filed as application No. PCT/US2019/026432 on Apr. 9, 2019, now abandoned.

(60) Provisional application No. 62/657,339, filed on Apr. 13, 2018.

(51) Int. Cl.
| | | |
|---|---|---|
| C09D 175/04 | (2006.01) | |
| B05D 5/00 | (2006.01) | |
| C08G 18/40 | (2006.01) | |
| C08G 77/26 | (2006.01) | |
| C09D 187/00 | (2006.01) | |
| C08G 18/10 | (2006.01) | |
| C08G 18/48 | (2006.01) | |
| C08G 18/50 | (2006.01) | |
| C08G 18/58 | (2006.01) | |
| C08G 18/77 | (2006.01) | |
| C08G 18/78 | (2006.01) | |

(52) U.S. Cl.
CPC ............. *C09D 175/04* (2013.01); *B05D 5/00* (2013.01); *C09D 187/005* (2013.01); *C08G 18/10* (2013.01); *C08G 18/4045* (2013.01); *C08G 18/4829* (2013.01); *C08G 18/5024* (2013.01); *C08G 18/581* (2013.01); *C08G 18/778* (2013.01); *C08G 18/7831* (2013.01); *C08G 77/26* (2013.01)

(58) Field of Classification Search
CPC ...... C08G 18/61–615; C08G 18/83–87; B05D 5/08–086; C09D 5/16–1693; C09K 3/18
See application file for complete search history.

(56) References Cited

U.S. PATENT DOCUMENTS

| | | |
|---|---|---|
| 4,520,144 A | 5/1985 | Noren et al. |
| 5,736,249 A * | 4/1998 | Smith ............... B05D 5/08 |
| | | 428/428 |
| 6,291,599 B1 | 9/2001 | Yang et al. |
| 8,268,214 B2 | 9/2012 | Chae et al. |
| 8,809,468 B2 | 8/2014 | Mowrer |
| 8,968,876 B2 | 3/2015 | Temple |
| 8,993,651 B2 | 3/2015 | Chang et al. |
| 9,127,116 B2 | 9/2015 | Xiu et al. |
| 11,053,337 B2 | 7/2021 | Rabnawaz |
| 11,118,003 B2 | 9/2021 | Rabnawaz et al. |
| 11,135,617 B2 | 10/2021 | Rabnawaz |
| 11,155,732 B2 | 10/2021 | Rabnawaz et al. |
| 11,396,574 B2 | 7/2022 | Rabnawaz et al. |
| 11,746,176 B2 | 9/2023 | Rabnawaz et al. |
| 11,802,204 B2 | 10/2023 | Rabnawaz |
| 11,814,470 B2 | 11/2023 | Rabnawaz et al. |
| 11,814,540 B2 | 11/2023 | Rabnawaz et al. |
| 2004/0132926 A1 | 7/2004 | Soldani |

(Continued)

FOREIGN PATENT DOCUMENTS

| | | |
|---|---|---|
| WO | WO-2016/176350 A1 | 11/2016 |
| WO | WO-2017/220591 A1 | 12/2017 |

(Continued)

OTHER PUBLICATIONS

U.S. Appl. No. 18/367,079, filed Sep. 12, 2023.
Edouk et al., Recent developments and applications of protective silicone coatings: A review of PDMS functional materials, Prog. Org. Coatings, 111:124-63 (2017).
International Application No. PCT/US2019/026432, International Search Report and Written Opinion, mailed Jun. 18, 2019.
Ji et al., Progress in polydimethylsiloxane-modified waterborne polyurethanes, RSC Adv., 7:34086-95 (2017).
Sommer et al., A preliminary study on the properties and fouling-release performance os siloxane-polyurethane coatings prepared from poly(dimethylsiloxane) (PDMS) macromers, Biofouling, 26(8):961-72 (Nov. 2010).

(Continued)

*Primary Examiner* — Stephen E Rieth
(74) *Attorney, Agent, or Firm* — MARSHALL, GERSTEIN & BORUN LLP

(57) ABSTRACT

The disclosure relates to methods for forming an omniphobic thermoset composition, such as an omniphobic polyurethane or epoxy composition. First and second thermosetting components are applied to a substrate and partially cured. A functionalized hydrophobic/oleophobic/omniphobic polymer which is reactive with at least the first thermosetting component is then applied to the coated substrate, which is then further cured to form a thermoset omniphobic coating on the substrate. The thermoset omniphobic composition has favorable omniphobic properties, for example as characterized by water and/or oil contact and/or sliding angles. The thermoset omniphobic composition can be used as a coating on any of a variety of substrates to provide omniphobic properties to a surface of the substrate. Such omniphobic coatings can be scratch resistant, ink/paint resistant, and optically clear. The thermoset omniphobic composition can be applied by different coating methods including cast, spin, roll, spray and dip coating methods.

29 Claims, 3 Drawing Sheets

(56) References Cited

U.S. PATENT DOCUMENTS

| | | |
|---|---|---|
| 2004/0185260 A1* | 9/2004 | Luzinov .................. C08J 3/245 |
| | | 428/413 |
| 2007/0026193 A1* | 2/2007 | Luzinov ............ D06M 15/3562 |
| | | 428/141 |
| 2009/0232752 A1 | 9/2009 | Carson et al. |
| 2010/0092689 A1 | 4/2010 | Chen et al. |
| 2014/0088219 A1 | 3/2014 | Chen et al. |
| 2014/0234579 A1 | 8/2014 | Wang et al. |
| 2016/0200937 A1 | 7/2016 | Hu et al. |
| 2017/0174910 A1 | 6/2017 | Nowak et al. |
| 2017/0247572 A1 | 8/2017 | Jaunky et al. |
| 2017/0267871 A1 | 9/2017 | Nowak et al. |
| 2020/0048459 A1 | 2/2020 | Rabnawaz |
| 2020/0347179 A1 | 11/2020 | Rabnawaz et al. |
| 2021/0040348 A1 | 2/2021 | Rabnawaz et al. |
| 2022/0145088 A1 | 5/2022 | Rabnawaz et al. |
| 2023/0028815 A1 | 1/2023 | Rabnawaz et al. |

FOREIGN PATENT DOCUMENTS

| | | |
|---|---|---|
| WO | WO-2020/142578 A1 | 7/2020 |
| WO | WO-2020/160089 A1 | 8/2020 |
| WO | WO-2020/167714 A1 | 8/2020 |
| WO | WO-2020/180760 A1 | 9/2020 |

OTHER PUBLICATIONS

U.S. Appl. No. 16/962,388, Rabnawaz et al., Omniphobically Coated Fluid Channels and Related Methods, filed Jul. 15, 2020.

U.S. Appl. No. 16/963,896, Rabnawaz et al., Omniphobic Polyurethane Compositions, Related Articles, and Related Methods, Jul. 22, 2020.

Desmodur N3600 Product Datasheet, Covestro, 4 pages, May 25, 2018.

Silmer NCO Di-50 Information, Siltech Corporation, 1 page, Oct. 2008.

* cited by examiner

METHODS FOR FORMING OMNIPHOBIC THERMOSET COMPOSITIONS AND RELATED ARTICLES

CROSS-REFERENCE TO RELATED APPLICATIONS

This application is a continuation of U.S. application Ser. No. 16/486,902, filed Aug. 19, 2019, which is a National Stage application of International Application No. PCT/US2019/026432, filed Apr. 9, 2019, which claims the benefit of U.S. Provisional Application No. 62/657,339 (filed Apr. 13, 2018), each of which is incorporated herein by reference in its entirety.

STATEMENT OF GOVERNMENT INTEREST

None.

BACKGROUND OF THE DISCLOSURE

Field of the Disclosure

The disclosure relates to methods for forming an omniphobic thermoset composition (such as an omniphobic polyurethane or epoxy composition). First and second thermosetting components are applied to a substrate and partially cured. A functionalized omniphobic polymer which is reactive with at least the first thermosetting component is then applied to the coated substrate, which is then further cured to form a thermoset omniphobic coating on the substrate.

Brief Description of Related Technology

When water accumulates on a surface, the surface energy of the material is directly related to how the water will interact. Some surfaces may allow the water to spread out into a pool with a large surface area, whereas others may make water bead up into droplets. The contact angle between the water droplet and the surface is used to characterize the surface into three categories: hydrophilic (<90°), hydrophobic (90°-150°), and superhydrophobic (>150°). FIG. 1 is a visual representation of a contact angle measurement.

Hydrophobicity can be achieved in two ways: controlling the chemical interactions between water and the material surface or altering the surface of the material. Generally, non-polar molecular groups are responsible water beading on a surface as opposed to spreading, due to the lower surface energies exhibited by non-polar groups. A lower surface energy of the material will directly relate to a high contact angle. In contrast, high-energy materials will cause water to spread out in a thin pool, as the polar groups present in surfaces with high energies attract the polar water molecules.

Physically altering the surface (e.g., increasing the roughness thereof) of the material may also increase the hydrophobicity of a material. By creating pillars or other similar features on a textured surface, water interacts with an increased surface area on the material, thus amplifying the chemical interactions between water and the surface. An image depicting how texturing the surface leads to increased contact angle can be seen below in FIG. 2. The use of a rough surface with nano-wells such as in FIG. 2 prevents water droplets from entering etched grooves. However, under a high enough pressure, the water will still disperse into the wells and such coatings are expensive and difficult to manufacture. Another method (not shown) utilizes a sponge coating that is doped with a hydrophobic material to prevent water dispersion. The sponge method works well at repelling water, but is not a durable material and will eventually degrade. Both of the previous methods generally either lack the feature of optical transparency or require costly additional steps and/or components to provide optical transparency. Optical transparency is key for the coating to allow for coated materials to still be visible.

A material that repels oils is known as oleophobic or lipophobic depending on if the repelling action is a physical or chemical property, respectively, and operates analogously to hydrophobic materials. These materials are often used on touch screen displays so that bodily oils and sweat gland secretions do not build up on the surface of a screen. A material that exhibits both hydrophobic and oleophobic properties is known as omniphobic. Such materials with very high contact angles are often regarded as "self-cleaning" materials, as contaminants will typically bead up and roll off the surface. As such, these materials have possible applications in screen display, window, sealant, and building material coatings.

Hu et al. U.S. Publication No. 2016/0200937 discloses polyurethane-based and epoxy-based compositions that be used as coatings and adhesives with abrasion-resistant, ink-resistant, anti-graffiti, anti-fingerprint properties. The disclosed process for making the compositions requires graft and block copolymer components along with a two-step/two-pot manufacturing process, increasing the time to manufacture and cost of the product.

SUMMARY

In one aspect, the disclosure relates to a method for forming an omniphobic coated article, the method comprising: applying to a substrate (i) at least one first thermosetting component (e.g., monomer, comonomer, prepolymer, oligomer, polymer with 2+ polymerizable functional groups) reactive with a second thermosetting component and a functionalized omniphobic polymer and (ii) at least one second thermosetting component (e.g., monomer, comonomer, prepolymer, oligomer, polymer with 2+ polymerizable functional groups) reactive with the first thermosetting component; reacting the at least one first thermosetting component with the at least one second thermosetting component to form a partially crosslinked reaction product (e.g., not fully crosslinked) comprising (i) at least some covalent bonds between the first thermosetting component and the second thermosetting component, and (ii) at least some unreacted functional groups reactive with the functionalized omniphobic polymer (e.g., unreacted functional groups from first thermosetting component; such as unreacted isocyanate, amine, hydroxy, and/or epoxide groups); applying to the partially crosslinked reaction product (e.g., a top surface thereof opposite the interface between the partially crosslinked reaction product and the substrate) at least one functionalized omniphobic polymer having a glass transition temperature ($T_g$) of 50° C. or less, the functionalized omniphobic polymer comprising a functional group (e.g., epoxide group, amino group, isocyanate group, hydroxyl group, carboxylic group) reactive with the first thermosetting component (e.g., "polymerization reaction product" when incorporated into the thermoset network or just a "reaction product" when a monofunctional functionalized omniphobic polymer is incorporated as a pendant or terminal chain in the thermoset network); and reacting the unreacted functional groups in the partially crosslinked reaction product with the functionalized omniphobic polymer to form a thermoset omniphobic coating on the substrate. This final reaction or (full) curing step incorporates the functionalized hydrophobic/oleophobic polymer into the thermoset by reaction with the unreacted functional groups from the first thermosetting component. This step can include further crosslinking between the first and second thermosetting components, given the partial crosslinking nature of the first reacting step. The functionalized omniphobic polymer can be more generally characterized as a functionalized hydrophobic/oleophobic/omniphobic polymer, given that it has hydrophobic and oleophobic characteristics.

Various refinements of the disclosed thermoset omniphobic composition are possible.

In a refinement, the substrate is selected from the group of metal, plastics, a different thermoset material, glass, wood, 3D printed objects, fabric (or textile), and ceramics. The substrate is not particularly limited, and generally can be formed from any material desired for protection with an omniphobic coating, in particular given the good, broad adhesive capabilities of the thermoset omniphobic composition. For example, the substrate can be a metal, plastic, a different thermoset material (e.g., a primer material; material other than the other than thermoset omniphobic composition), glass, wood, fabric (or textile), or ceramic material. Examples of specific metals include steel, aluminum, copper, etc. Examples of specific plastics include polyvinyl alcohol (PVOH), ethylene vinyl alcohol (EVOH), polyethylene terephthalate (PET), polypropylene (PP), polyethylene (PE), starch, chitosan, etc. Suitable wood materials can be any type of wood commonly used in home, office, and outdoor settings. Suitable glass materials can be those used for building windows, automobile windows, etc. In some embodiments, the substrate is a top layer of a coating or series of coatings on a different underlying substrate. For example, the coated article can include a substrate material as generally disclosed herein, one or more intermediate coatings on the substrate (e.g., an epoxy coating, an acrylic coating, another primer coating, etc.), and the thermoset omniphobic composition on the one or more intermediate coatings as the final, external coating on the coated article.

In a refinement, applying the first thermosetting component and the second thermosetting component comprises: applying to the substrate a mixture comprising (i) the first thermosetting component, (ii) the second thermosetting component, and (iii) optionally a solvent. In a further refinement, the method comprises performing one or more of spraying, casting, rolling, and dipping to apply the mixture to the substrate. In a further refinement, the mixture comprises the solvent. The solvent can be an aprotic organic solvent such as acetone, tetrahydrofuran, 2-butanone, esters (e.g., methyl, ethyl, n-propyl, butyl esters of acetic acid such as n-butyl acetate, etc.), dimethylformamide, dimethyl carbonate, etc. In some embodiments, a reaction catalyst such as salts of tin (e.g., tin(II) 2-ethylhexanoate) or iron, and tertiary amines (e.g., triethylamine) can be included in the mixture, for example to catalyze the reaction between a polyisocyanate and a polyol as the first and second thermosetting components to form a thermoset polyurethane. Tertiary amines can be used as catalysts for epoxy curing, which are added into the formulation or generated in situ during amine reaction with epoxy.

In a yet further refinement, the method further comprises after applying the first thermosetting component and the second thermosetting component to the substrate, drying the substrate to remove the solvent, thereby forming a coating (partially crosslinked) of the first thermosetting component and the second thermosetting component on the substrate. Drying is generally performed at ambient conditions and before heating to accelerate the reaction to form the partially crosslinked reaction product. However, some reaction/partial crosslinking between the first and second thermosetting components can occur during drying, but the majority of reaction occurs after solvent removal. In certain cases, partial crosslinking can be performed under ambient conditions without heating the samples prior to application of the functionalized omniphobic polymer.

In a refinement, the method further comprises (e.g., prior to partial crosslinking/partial curing): applying to the substrate one or more additives selected from the group consisting of nanoclay, graphene oxide, graphene, silicon dioxide (silica), aluminum oxide, cellulose nanocrystals, carbon nanotubes, titanium dioxide (titania), diatomaceous earth, biocides, pigments, dyes, thermoplastics, and combinations thereof. The additives can be included in the mixture with the first thermosetting component, the second thermosetting component, and the (optional) solvent, and then applied together on the substrate.

In a refinement, the method comprises reacting the at least one first thermosetting component with the at least one second thermosetting component to form a partially crosslinked reaction product (i) at temperature from 20° C. to 150° C. (e.g., 20° C., 40° C., or 60° C. to 80° C., 100° C., or 150° C.) and (ii) for a time from 1 min to 300 min (e.g., 1, 2, 5, or 10 min to 20, 40, 60, 120, or 300 min). The reaction can be performed with or without heating the reaction mixture. Room-temperature (e.g., 20° C. to 30° C.) reactions are possible with longer reaction times and/or the addition of a catalyst In a refinement, applying the functionalized omniphobic polymer comprises: applying to the partially crosslinked reaction product a mixture comprising (i) the functionalized omniphobic polymer, and (ii) a solvent. The same solvents (or a different solvent) can be used as for the mixture with the first and second thermosetting component. The mixture can be applied by spraying, casting, rolling, and dipping as well.

In a further refinement, the method further comprises: after applying the functionalized omniphobic polymer to the partially crosslinked reaction product, drying the substrate to remove the solvent. Drying is generally performed at ambient conditions and before heating to accelerate the reaction to form the fully cured/crosslinked thermoset omniphobic coating. However, some reaction/further crosslinking between the first and second thermosetting components as well as the functionalized omniphobic polymer can occur during drying, but the majority of reaction occurs after solvent removal. Drying also provides some time for the functionalized omniphobic polymer as applied to the external surface of the partially crosslinked reaction product to penetrate into the interior of the partially crosslinked reaction product coating. Depending on the thickness of the partially crosslinked reaction product coating and the drying time before full curing (e.g., either due to application of heat or at low/ambient temperatures such as with a catalyst), the functionalized omniphobic polymer can be incorporated into either an exterior/top region of the final thermoset omniphobic coating, or it can be distributed substantially throughout the thermoset omniphobic coating (e.g., for sufficient drying time and/or sufficiently thin partially crosslinked reaction product coatings such that the functionalized omniphobic polymer penetrates essentially completely through the coating to the substrate prior to curing). The functionalized omniphobic polymer as applied to the top layer of the partially crosslinked coating will generally diffuse through the samples. The functionalized omniphobic polymer is very reactive with the unreacted (first) thermosetting component functional groups, and as a result, the relative degree of incorporation of the % of the functionalized omniphobic polymer can exhibit a normal concentration gradient that gradually decreases from the outer surface of the final coating towards the bottom of the final coating adjacent to the substrate.

In a refinement, the method comprises reacting the unreacted functional groups in the partially crosslinked reaction product with the functionalized omniphobic polymer to form a thermoset omniphobic coating on the substrate (i) at a temperature from 20° C. to 180° C. and (ii) for a time from 1 hr to 24 hr. Curing can be performed by heating (e.g., in an oven, with exposure to a heat lamp, etc.) at a temperature from 70° C. or 100° C. to 140° C. or 180° C. and/or for a time from 1 hr, 2 hr, or 4 hr to 6 hr, 12 hr, or 24 hr. Lower heating temperature or ambient temperature curing also possible, such as room temperature curing (e.g., 20° C. to 30° C.) for 8 hr-240 hr, or lower heating (e.g., 30° C. or 40° C. to 60° C. for 4 hr-96 hr or 60° C. to 80° C. for 1 hr-72 hr).

In a refinement, the thermoset omniphobic coating comprises: a thermoset polymer comprising a crosslinked backbone, the crosslinked backbone comprising: (i) first backbone segments having a structure corresponding to a (polymerization) reaction product (e.g., polymerization reaction product when incorporated into the thermoset network) from the at least one first thermosetting component with at least one of the second thermosetting component and the functionalized hydrophobic/oleophobic/omniphobic polymer; (ii) second backbone segments having a structure corresponding to a (polymerization) reaction product from the functionalized omniphobic polymer with the first thermosetting component; (iii) third backbone segments having a structure corresponding to a (polymerization) reaction product (e.g., polymerization reaction product when incorporated into the thermoset network) reaction product from the second thermosetting component with the first thermosetting component; (iv) first linking groups linking the first backbone segments and the third backbone segments, the first linking groups having a structure corresponding to a reaction product of the first thermosetting component and the second thermosetting component; and (v) second linking groups linking the first backbone segments and the second backbone segments, the second linking groups having a structure corresponding to a reaction product of the first thermosetting component and the functionalized omniphobic polymer.

In a further refinement, the first backbone segments are present in an amount ranging from 10 wt. % to 90 wt. % relative to the thermoset polymer; the second backbone segments are present in an amount ranging from 0.01 wt. % to 20 wt. % (e.g., 0.2-8 wt. % or 1-5 wt. % more preferably) relative to the thermoset polymer; and the third backbone segments are present in an amount ranging from 10 wt. % to 90 wt. % relative to the thermoset polymer. More generally, the first, second, and third backbone segments can be incorporated into the thermoset omniphobic coating in a variety of relative weight amounts. In an embodiment, the first backbone segments are present in an amount ranging from 10 wt. % to 90 wt. % relative to the thermoset omniphobic coating (e.g., at least 10, 15, or 20 wt. % and/or up to 30, 40, 50, 60, 70, 80, or 90 wt. %; such as 30 wt. % to 70 wt. %). In an embodiment, the second backbone segments are present in an amount ranging from 0.01 wt. % to 20 wt. % relative to the thermoset omniphobic coating (e.g., at least 0.01, 0.1, 0.2, 0.5, 1, 2, 3, or 5 wt. % and/or up to 3, 5, 8, 10, 15 or 20 wt. %; such as 0.2 wt. % to 8 wt. % or 1 wt. % to 5 wt. %). In an embodiment, the third backbone segments are present in an amount ranging from 10 wt. % to 90 wt. % relative to the thermoset omniphobic coating (e.g., at least 10, 20, 30, 40, or 50 wt. % and/or up to 70, 80, or 90 wt. %, such as 30 wt. % to 70 wt. %). The foregoing ranges can apply as well to the relative weight amounts of the first thermosetting component, the functionalized omniphobic polymer, and the second thermosetting component relative to the total weight amount of the three components before crosslinking reactions and/or relative to all monomeric, oligomeric, and polymeric reaction components added thereto. These components can be derived from renewable as well as non-renewable resources.

In a refinement, the functional group of the functionalized omniphobic polymer is selected from the group consisting of epoxide groups, amino groups, isocyanate groups, hydroxyl groups, carboxylic groups, and combinations thereof (e.g., for multifunctional functionalized omniphobic polymers). Several specific functionalized omniphobic polymer functional groups and their complementary groups in the first thermosetting component are illustrated as follows. Isocyanate groups in the functionalized omniphobic polymer can react with amino groups of the first thermosetting component to make a urea linkage, such as in an epoxy thermosets. Amino groups in the functionalized omniphobic polymer can react with isocyanate groups in the first thermosetting component to make a urea link, such as in a polyurethane thermoset. Amino groups in the functionalized omniphobic polymer can react with epoxide groups in the first thermosetting component to make beta-hydroxy tertiary amine links, such as in an epoxy thermoset. Amino groups in the functionalized omniphobic polymer can react with carboxylic groups in the first thermosetting component to make an amide link, such as in an acrylic thermoset. Amino groups in the functionalized omniphobic polymer can react with isocyanate groups of the first thermosetting component to make a urea linkage, such as in an epoxy thermosets cured with anhydrides having added isocyanate groups to the anhydride monomer units. Epoxide groups in the functionalized omniphobic polymer can react with amino groups in the first thermosetting component to make beta-hydroxy tertiary amine links, such as in an epoxy thermoset. Hydroxyl groups in the functionalized omniphobic polymer can react with isocyanate groups in the first thermosetting component to make a urethane link, such as in a polyurethane thermoset. Hydroxyl groups in the functionalized omniphobic polymer can react with carboxylic groups in the first thermosetting component to make an ester link, such as in an acrylic thermoset. Carboxylic groups in the functionalized omniphobic polymer can react with hydroxyl groups in the first thermosetting component to make an ester link, such as in a polyurethane thermoset. Carboxylic groups in the functionalized omniphobic polymer can react with amino groups in the first thermosetting component to make an amide link, such as in an epoxy thermoset.

In a refinement, the functionalized omniphobic polymer is selected from the group consisting of functionalized polysiloxanes, functionalized polyperfluoroethers, functionalized polybutadienes, functionalized polysilazanes, functionalized polyisobutenes, functionalized branched polyolefins, functionalized poly(meth)acrylates, and combinations thereof.

In a refinement, the functionalized omniphobic polymer comprises a mono-functional functionalized omniphobic polymer (e.g., having only a single functional group reactive with the first thermosetting component, such as at a terminal location of the hydrophobic polymer; such as a mono-functional polysiloxane).

In a refinement, the functionalized omniphobic polymer comprises a di-functional functionalized omniphobic polymer (e.g., having only two functional groups reactive with the first thermosetting component, such as at terminal locations of the hydrophobic polymer; such as a di-functional polysiloxane).

In a refinement, the functionalized omniphobic polymer comprises a poly-functional functionalized omniphobic polymer (e.g., having three, four, or more functional groups reactive with the first thermosetting component, such as at terminal locations of the hydrophobic polymer and/or as pendant groups along the backbone of the hydrophobic polymer; such as a poly-functional polysiloxane).

In a refinement, the functionalized omniphobic polymer is a liquid at a temperature in a range from −130° C. to 40° C. In various embodiments, the functionalized omniphobic polymer is a liquid at a temperature in a range from 10° C. to 40° C. (e.g., from 20° C. to 30° C., or about room temperature, such as where the functionalized omniphobic polymer has a melting temperature ($T_m$) below 10° C. or 20° C.). The amine groups can be terminal and/or pendant from the hydrophobic polymer.

In a refinement, the functionalized omniphobic polymer has a molecular weight ranging from 300 to 50,000 g/mol. The functionalized omniphobic polymer can have any suitable molecular weight in view of desired glass transition temperature, for example having a molecular weight ranging from 300 to 50,000 g/mol. In various embodiment, the molecular weight can be at least 300, 800, 1000, 1500, or 2000 and/or up to 1000, 2000, 3000, 5000, or 50,000 g/mol. The molecular weight can be expressed as a number-average or weight-average value in the units of gram/mole (g/mol). Some embodiments can include a blend of two or more functionalized omniphobic polymers with different average molecular weights, such as one with 300-1500 g/mol and another with 1500-50,000 g/mol with a higher average molecular weight than the first. Blends of functionalized omniphobic polymers (e.g., differing in molecular weight and/or in degree of functionality) can improve the combination of water- and oil-repellency properties of the final composition. For example, a mono-functionalized polysiloxane can provide better water and oil repellency than a di-functionalized polysiloxane. Low MW functionalized polysiloxanes (e.g., PDMS, such as having a MW range of about 800-1200 g/mol or an average MW of about 1000 g/mol) can provide an improved water repellency, while Higher MW functionalized polysiloxanes (e.g., PDMS, such as about 2000 g/mol or above for an average or range of MW) can provide an improved oil repellency.

In a refinement, the first thermosetting component and the second thermosetting component together correspond to a thermoset polyurethane. For example, the first and second thermosetting components can include at least one polyisocyanate and at least one polyol, where at least one component is reactive with the functional group of the functionalized omniphobic polymer.

In a refinement, the first thermosetting component comprises a polyisocyanate or a polyol; and the second thermosetting component comprises the other of the polyisocyanate and the polyol. The polyisocyanate can be di-, tri-, or higher functional such as a diisocyanate, triisocyanate, blend of multiple polyisocyanates with same or different functionality; polyol can be di-, tri-, or higher functional such as a diol, triol, blend of multiple polyols with same or different functionality; at least one polyisocyanate or polyol has a functionality greater than two for crosslinking.

The "first" and "second" labels for the thermosetting components are interchangeable with respect to their ability to react with each other and form a crosslinked, thermoset network portion of the final thermoset polymer, which in the case of a polyisocyanate/polyol combination corresponds to a urethane linking group as the first linking group L1. The distinction is that the first thermosetting component is also capable of reacting with the functional group of the functionalized omniphobic polymer, while the second thermosetting component could (but need not) also be capable of reacting with the functional group of the functionalized omniphobic polymer.

For example, the polyisocyanate can be first thermosetting component when the functionalized omniphobic polymer has an isocyanate-reactive functional group (e.g., such as an amino group to form a urea group as the second linking group L2, or such as a hydroxyl group for form a urethane group as second linking group L2), in which case the polyol can be the second thermosetting component and need not react (or be unable to react) with the functionalized omniphobic polymer. Similarly, the polyol can be first thermosetting component when the functionalized omniphobic polymer has a hydroxyl-reactive functional group (e.g., such as a carboxylic group to form an ester group as the second linking group L2), in which case the polyisocyanate can be the second thermosetting component and need not react (or be unable to react) with the functionalized omniphobic polymer.

In a further refinement, the polyisocyanate is selected from the group consisting of 1,5-naphthylene diisocyanate, 4,4'-diphenylmethane diisocyanate (MDI), hydrogenated MDI, xylene diisocyanate (XDI), tetramethylxylol diisocyanate (TMXDI), 4,4'-diphenyl-dimethylmethane diisocyanate, di- and tetraalkyl-diphenylmethane diisocyanate, 4,4'-dibenzyl diiso-cyanate, 1,3-phenylene diisocyanate, 1,4-phenylene diisocyanate, one or more isomers of tolylene diisocyanate (TDI), 1-methyl-2,4-diiso-cyanatocyclohexane, 1,6-diisocyanato-2,2,4-trimethyl-hexane, 1,6-diisocyanato-2,4,4-trimethylhexane, 1-iso-cyanatomethyl-3-iso-cyanato-1,5,5-trimethylcyclohexane, chlorinated and brominated diisocyanates, phosphorus-containing diisocyanates, 4,4'-diisocyanatophenyl-perfluoroethane, tetramethoxybutane 1,4-diisocyanate, butane 1,4-diisocyanate, hexane 1,6-diisocyanate (HDI), HDI dimer (HDID), HDI trimer (HDIT), HDI biuret, 1,5-pentamethylene diisocyanate (PDI), PDID (dimer of PDI), PDIT (trimer of PDI), PDI biuret, dicyclohexylmethane diisocyanate, cyclohexane 1,4-diisocyanate, ethylene diisocyanate, phthalic acid bisisocyanatoethyl ester, 1-chloromethylphenyl 2,4-diisocyanate, 1-bromomethylphenyl 2,6-diisocyanate, 3,3-bischloromethyl ether 4,4'-diphenyldiisocyanate, trimethylhexamethylene diisocyanate, 1,4-diisocyanato-butane, 1,2-diisocyanatododecane, and combinations thereof.

In a further refinement, the polyol is selected from the group consisting of polyether polyols, hydroxlated (meth)acrylate oligomers, glycerol, ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, glycerol, trimethylolpropane, 1,2,6-hexanetriol, pentaerythritol, (meth)acrylic polyols, isosorbide, and combinations thereof.

In a refinement, the first thermosetting component comprises a polyisocyanate; the second thermosetting component comprises a polyol; and the functional group of the functionalized omniphobic polymer comprises an amino group.

In a refinement, the first thermosetting component and the second thermosetting component together correspond to a thermoset epoxy. For example, the first and second thermosetting components can include at least one polyepoxide and at least one amine (monoamine or polyamine) or anhydride (e.g., forming a beta-hydroxy ester reaction product link, such as at high reaction temperatures), where at least one component is reactive with the functional group of the functionalized omniphobic polymer.

In a refinement, the first thermosetting component comprises a polyepoxide or an amine; and the second thermosetting component comprises the other of the polyepoxide and the amine. The polyepoxide can be di-, tri-, or higher functional such as a diepoxide, triepoxide, blend of multiple polyisocyanates with same or different functionality; amine can be mono-, di-, tri-, or higher functional such as a monoamine, diamine, triamine, blend of multiple polyols with same or different functionality; at least one polyepoxide has a functionality greater than two or at least one amine has a functionality greater than one for crosslinking (i.e., since a single —$NH_2$ primary amino group can react with two epoxide groups, either some species with 3+ epoxide groups or 2+ amino groups (which can form 4+ bonds with epoxides) are used for crosslinking). Typically a diepoxide and a diamine are used.

The "first" and "second" labels for the thermosetting components are interchangeable with respect to their ability to react with each other and form a crosslinked, thermoset network portion of the final thermoset polymer, which in the case of a polyepoxide/amine combination corresponds to a beta-hydroxy (tertiary) amine linking group as the first linking group L1. A "beta-hydroxy amine" includes a structure in which a hydroxyl group is attached to a beta carbon, the beta-carbon is attached to an alpha-carbon, and the alpha carbon in the one directly attached to the nitrogen atom of the reacted amine. The beta-hydroxy amine can be represented by a —$CH(OH)$—$CH_2$—$NR_1R_2$ group in the cured epoxy thermoset, where $R_1$ and $R_2$ can be another beta-hydroxy group or the remainder of the amine thermosetting component. The distinction is that the first thermosetting component is also capable of reacting with the functional group of the functionalized omniphobic polymer, while the second thermosetting component could (but need not) also be capable of reacting with the functional group of the functionalized omniphobic polymer.

For example, the polyepoxide can be first thermosetting component when the functionalized omniphobic polymer has an epoxide-reactive functional group (e.g., such as an amino group to form a beta-hydroxy amine group as the second linking group L2), in which case the amine can be the second thermosetting component and need not react (or be unable to react) with the functionalized omniphobic polymer. Similarly, the amine can be first thermosetting component when the functionalized omniphobic polymer has an amine-reactive functional group (e.g., such as an isocyanate to form a urea as the second linking group, such as an epoxide group to form a beta-hydroxy amine group as the second linking group, such as a carboxylic acid group to form an amide group as the second linking group L2), in which case the polyepoxide can be the second thermosetting component and need not react (or be unable to react) with the functionalized omniphobic polymer.

In a further refinement, the polyepoxide is selected from the group consisting of polyepoxide-substituted aromatic hydrocarbons, aliphatic hydrocarbons, cycloaliphatic hydrocarbons, ethers thereof, esters thereof, imines thereof, and combinations thereof. The polyepoxide can include hydrocarbons with two or more epoxide groups and one or more aromatic, aliphatic, cycloaliphatic, ether, ester, and/or imine groups in the hydrocarbon to which the epoxide groups are attached. Suitable polyepoxides can be derived from petroleum and plant materials. Suitable polyepoxides include two or more glycidyl ether groups (i.e., epoxide-containing groups). Some examples of polyepoxides include, but are not limited to, bisphenol A epoxy (e.g., diglycidyl ether of bisphenol A having 1 or 2-25 bisphenol A repeat units), bisphenol F epoxy (e.g., diglycidyl ether of bisphenol F having 1 or 2-25 bisphenol F repeat units), epoxy phenol novolac, epoxy cresol novolac, cycloaliphatic epoxies, halogenated epoxies, epoxy-vinyl esters, tetraglycidylmethylenedianiline (TGMDA), 3,4-epoxycyclohexylmethyl 3,4-epoxycyclohexanecarboxylate (ECC), bis[3,4-epoxycyclohexylmethyl] adipate (BECHMA), poly (glycidyl methacrylate), epoxies of rosin acid, epoxies of diphenolic acid, epoxies of tannin acid, epoxies derived from glucose, isosorbide epoxies, eugenol epoxides, furan epoxides, cathechin epoxides, vanillin-based epoxies, quercetin epoxides, epoxies derived from gallic acid, epoxides from phenols, epoxides from cardanols, epoxides from plant oils, terpene oxides (e.g., limonene dioxide), and combinations thereof.

In a further refinement, the amine is selected from the group consisting of polyamine-substituted aromatic hydrocarbons, aliphatic hydrocarbons, cycloaliphatic hydrocarbons, ethers thereof, esters thereof, imines thereof, and combinations thereof. The amine can include hydrocarbons with two or more amino groups and one or more aromatic, aliphatic, cycloaliphatic, ether, ester, and/or imine groups in the hydrocarbon to which the amino groups are attached. Suitable amines can be derived either petrochemicals or plant materials. Some examples include, but are not limited to, isophorone diamine, diaminopropyl isosorbide, furfuryldiamine, polylysine, menthane diamine, tris(dimethylaminomethyl)phenol, melamine, bis(3-aminopropyl)amine, N,N'-bis(3-aminopropyl)-1,3-propanediamine, 3,3'-diamino-N-methyldipropylamine, tris(3-aminopropyl)amine, 1,2-bis(3-aminopropylamino)ethane, diethylenetriamine, polyetheramines (e.g., JEFFAMINE polyetheramines available from Huntsman Chemical). The amines can be primary, secondary or a combination of both.

In a refinement, the first thermosetting component comprises an amine; the second thermosetting component comprises a polyepoxide; and the functional group of the functionalized omniphobic polymer comprises an isocyanate group.

In a refinement, the first thermosetting component and the second thermosetting component together correspond to an acrylic thermoset. An acrylic thermoset can include acrylic or methacrylic oligomer or polymer chains having grafted (e.g., randomly, statistically, gradiently or blockwise) reactive groups, such as carboxylic, carboaxmide, hydroxyl, acrylic double bond, and/or epoxide groups. These groups can reacts with themselves or with co-reactants. Examples carboxyl-diepoxides, hydroxyl-epoxy and urea or melamine condensation products, alkoxymethyl carboxamide-self-reactive, epoxy, alkyd, functional vinyl, allylic double bond-peroxide catalyzed, and allylic double bond-peroxide catalyzed grafted reactive groups.

In a refinement, the thermoset omniphobic coating has a water contact angle in a range from 90° to 120°. In a refinement, the thermoset omniphobic coating has an oil contact angle in a range from 1° to 65°. In a refinement, the thermoset omniphobic coating has a water sliding angle in a range from 1° to 30° for a 75 µl droplet. In a refinement, the thermoset omniphobic coating has an oil sliding angle in a range from 1° to 20° for a 25 µl droplet.

More generally, the omniphobic properties of the thermoset omniphobic coating (e.g., for the cured composition) can be characterized in terms of one or more contact angles and/or sliding angles for water and/or oil droplets (e.g., vegetable oil and/or hexadecane) on the thermoset coating (e.g., as a coating on a substrate). The following ranges are representative of coatings according to the disclosure which display favorable omniphobic properties. In an embodiment, the coating has a water contact angle in a range from 90° to 120° (e.g., at least 90°, 95°, 100°, or 105° and/or up to 110°, 115°, or 120°; such as for the cured composition as a coating). In some cases, the water contact angle can be up to about 125° for non-smooth or rough surfaces. In an embodiment, the coating has an oil contact angle in a range from 0° or 1° to 65° (e.g., at least 1°, 10°, 20°, or 30° and/or up to 40°, 50°, 60°, or 65°; such as for the cured composition as a coating). In an embodiment, the composition has a water sliding angle in a range from 0° or 1° to 30° for a 75 µl droplet (e.g., at least 1°, 2°, 4°, 6°, or 8° and/or up to 10°, 15°, 20°, or 30°; such as for the cured composition as a coating). In an embodiment, the coating has an oil sliding angle in a range from 0° or 1° to 20° for a 25 µl droplet (e.g., at least 1°, 2°, 4°, 6°, or 8° and/or up to 10°, 12°, 15°, or 20°; such as for the cured composition as a coating). The contact angles for the omniphobic coatings can be higher when nanofillers (e.g., clay, silica, etc.) are included in the composition as compared to corresponding compositions without any nanofillers.

In a refinement, the thermoset omniphobic coating has a thickness ranging from 0.01 µm to 500 µm. More generally, the thermoset omniphobic coating can have any desired thickness on the substrate. In common applications, the coating has a thickness ranging from 0.010 µm to 500 µm, for example at least 0.01, 10, 20, 50, or 100 µm and/or up to 200, 500 µm. Typical cast coatings can have thicknesses of 10 µm to 100 µm. Typical spin coatings can have thicknesses of 0.05 µm or 0.10 µm to 0.20 µm or 0.50 µm. Multiple coating layers can be applied to substrate to form even thicker layers of the composition 100 (e.g., above 500 µm or otherwise) if desired.

In a refinement, the thermoset omniphobic coating is scratch-resistant, ink-resistant, and optically clear.

In another aspect, the disclosure relates to an omniphobic coated article formed by or resulting from the disclosed method in any of its variously disclosed embodiments.

While the disclosed methods and compositions are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

BRIEF DESCRIPTION OF THE DRAWINGS

For a more complete understanding of the disclosure, reference should be made to the following detailed description and accompanying drawings wherein.

DETAILED DESCRIPTION

The disclosure relates to methods for forming an omniphobic thermoset composition (such as an omniphobic polyurethane or epoxy composition). First and second thermosetting components are applied to a substrate and partially cured. A functionalized hydrophobic/oleophobic polymer which is reactive with at least the first thermosetting component is then applied to the coated substrate, which is then further cured to form a thermoset omniphobic coating on the substrate. This second curing step incorporates the functionalized hydrophobic/oleophobic polymer into the thermoset by reaction with the unreacted functional groups from the first thermosetting component. This second curing step can include further crosslinking between the first and second thermosetting components, given the partial crosslinking nature of the first reacting step. The thermoset omniphobic composition has favorable omniphobic properties, for example as characterized by water and/or oil contact and/or sliding angles. The thermoset omniphobic composition can be used as a coating on any of a variety of substrates to provide omniphobic properties to a surface of the substrate. Such omniphobic coatings can be scratch resistant, ink/paint resistant, and optically clear. The thermoset omniphobic composition can be applied by different coating methods including cast, spin, roll, spray and dip coating methods.

The disclosed composition includes a polymer which can be used as a coating with the ability to bind to metal, glass, wood, fabrics, and ceramics with relative ease, in particular due to the strong adhesive properties of its urethane group or epoxy group constituents in various embodiments. The polymer coating has an omniphobic quality, repelling water, oils, inks, and spray paints, thus allowing for a coating that not only has typical hydrophobic and oleophobic properties, but also protects a surface from pen inks and various paints. The final polymer product is optically clear (even for relatively thick coatings such as up to about 500 µm), making it an ideal choice for coating computer and phone screens, windows, and cameras (e.g., lenses or protective/shielding windows therefor) for cars or other vehicles, whether human- or autopilot-driven. The polymer can be manufactured without fluorine as a component and/or as a one-pot reaction process, thus reducing the overall cost when compared to products currently manufactured. Coatings formed from the polymer composition are durable due to the final crosslinked thermoset matrix. The composition can be used in water-repellent, oil-repellent, anti-fingerprint, anti-smudge, and/or anti-graffiti coatings or paints.

Figure 3:
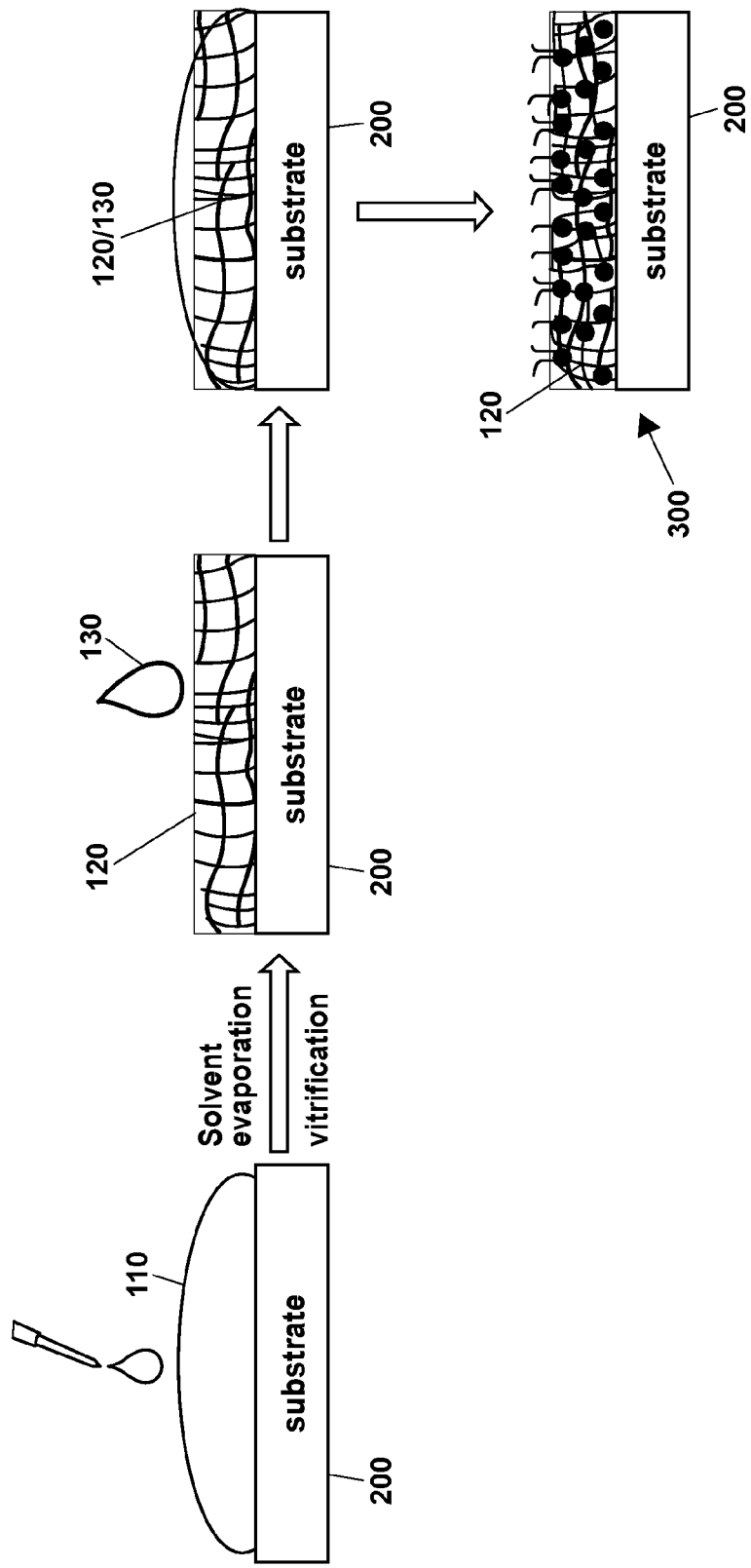
FIG. 3 illustrates a method for forming a thermoset omniphobic composition coating according to the disclosure.

FIG. 3 illustrates a method for forming a thermoset omniphobic composition coating according to the disclosure, for example an optically clear, durable and self-cleaning epoxy, polyurethane, or other thermoset material (e.g., acrylics or alkyds) omniphobic coating. As an illustration for a thermoset epoxy omniphobic coating, an initial epoxy coating is created and drop cast onto the desired substrate (e.g., glass, metal, etc.), as shown in FIG. 3 (top row, left image). After partially crosslinking for a predetermined amount of time, isocyanate-functionalized polydimethyl siloxane (PDMS-NCO) is applied in a suitable solvent via a cotton ball or cotton roller and then air dried to set and cured at an elevated temperature. FIG. 3 (top row, middle and right images) illustrates the application of the PDMS-NCO to the partially cured epoxy coating and its absorption or permeation into the interior of the partially cured/crosslinked epoxy coating matrix prior to full curing (bottom row, right image). The result is a thermoset epoxy polymer coating that contains a matrix of PDMS units that are covalently bonded to the thermoset polymer via urea links resulting from isocyanate groups (in PDMS-NCO) reactions with amino groups (in the epoxy amine hardener), which coating is optically clear and highly resistant to water, oil, and graffiti. The same process can be applied to a thermoset polyurethane, in which case an amino-functionalized PDMS (PDMS-$NH_2$) can be substituted for the PDMS-NCO used for modification of a partially crosslinked epoxy coating. Specifically, the result in this case is a thermoset polyurethane polymer coating that contains a matrix of PDMS units that are covalently bonded to the thermoset polymer via urea links resulting from amino groups (in PDMS-$NH_2$) reactions with isocyanate groups (in the polyurethane polyisocyanate monomer). The —NCO and —$NH_2$ functional groups in the functionalized PDMS serve as a reactant to help disperse the PDMS throughout the partially cured/crosslinked matrix, avoiding aggregates that can turn the coating opaque and hinder the optical and repellent performance of the coating. This approach does not require graft or block copolymers, and this approach works with various thermosets (e.g., epoxy, urethane, etc.), and it is thus a significant advancement in the ease of implementation and automation of a historically challenging problem.

The disclosure illustrates a simple, scalable strategy that transforms a non-oleophilic and mildly water-repellent coating into a water- and oil-repellent, anti-graffiti and anti-smudge coating. The general approach is to modify a non-oil repellent (and mildly hydrophobic) coating into an oil- and water-repellent coating while retaining excellent mechanical and optical properties. The examples illustrate successful epoxy and polyurethane coatings formed using this approach, and both showed extremely good properties. Additionally, this approach can be applied to other coatings such as acrylics, alkyds, for example. Also, this approach can be easily applied to self-cleaning thermoset composites such as epoxy composites, for example including epoxy/clay, epoxy/graphene, epoxy/cellulose nanocrystal, epoxy/carbon-nanotube, epoxy/titania ($TiO_2$), and epoxy/silica ($SiO_2$) composites. Such composites can also be prepared with a thermoset polyurethane or other coating matrix according to the disclosure.

The disclosure illustrates methods to prepare optically clear, durable and self-cleaning epoxy and polyurethane coatings (that are extendable to other types of coatings too). The disclosed methods address the challenges of graft copolymer approaches and the use of volatile solvents related to the optically clear and durable, water and oil-repellent, and anti-graffiti coatings. This approach is applicable to a variety of coatings both in the presence and absence of particles/fillers in the matrix, which is not the case with the other approaches. Two characteristics of the disclosed methods include: 1) formation of a partially cross-linked matrix that allows the self-cleaning polymers such as polysiloxane (or other functionalized omniphobic polymers) to permeate into the matrix to ensure its uniform distribution in the matrix; and 2) presence of complementary reactive groups in the partially crosslinked matrix (e.g., unreacted amino or isocyanate groups for epoxy and polyurethane monomers, respectively) as well as the self-cleaning polymer (e.g., isocyanate or amino groups for PDMS-NCO or PDMS-$NH_2$). Preferably, these complementary groups react substantially faster than the reactions between the corresponding groups in the thermoset monomers, thus promoting permeation and reaction of the functionalized omniphobic polymer with the thermoset matrix before the full curing of thermoset coating occurs. For example, the PDMS-NCO/amine hardener reaction is faster than the epoxy resin/amine hardener reaction for a thermoset epoxy. Similarly, the PDMS-$NH_2$/polyisocyanate reaction is faster than the polyisocyanate/polyol reaction for a thermoset polyurethane.

Omniphobic Composition

Figure 4:
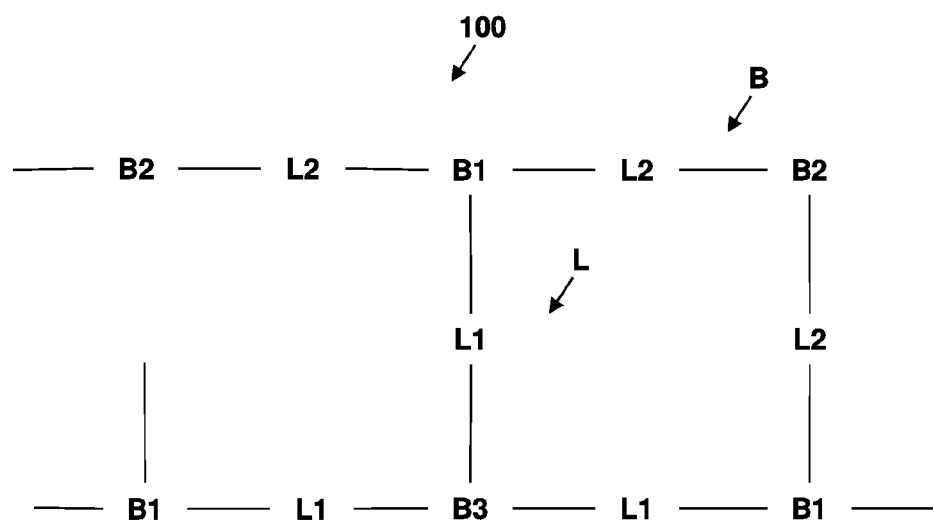
FIG. 4 illustrates a thermoset omniphobic composition according to the disclosure.

FIG. 4 illustrates a thermoset omniphobic composition, for example for use as a coating according to the disclosure. FIG. 4 qualitatively illustrates various backbone segments (B) and linking groups (L) in a crosslinked thermoset polymer 100. The thermoset polymer 100 includes a crosslinked backbone B, which in turn includes (i) first backbone segments B1, (ii) second backbone segments B2, (iii) third backbone segments B3, (iv) first linking groups L1 (e.g., urethane (or carbamate), beta-hydroxy amino) linking first backbone segments and third backbone segments, and (v) second linking groups L2 (e.g., urea) linking first backbone segments and second backbone segments.

As described in more detail below, in embodiments corresponding to a thermoset polyurethane composition, the first backbone segments B1 can result from a polyisocyanate (e.g., monomer, oligomer, or polymer), the second backbone segments B2 can result from a polysiloxane or other omniphobic polymer (e.g., amino-functional omniphobic polymer), and the third backbone segments B3 can result from a polyol (e.g., monomer, oligomer, or polymer). The first linking groups L1 can include urethane (or carbamate) groups and be represented by the general structure —$NR_1$—C(=O)O—, where $R_1$ can be H or a $C_1$-$C_{12}$ linear, branched, or cyclic substituted or unsubstituted hydrocarbon group, such as an aliphatic (e.g., alkyl, alkenyl) group or an aromatic group, or a combination of different $R_1$ groups (such as when multiple different reactive components are used). The second linking groups L2 can include urea groups and can be represented by the general structure —$NR_2$—C(=O)—$NR_3$—, where $R_2$ and $R_3$ independently can be H or a $C_1$-$C_{12}$ linear, branched, or cyclic substituted or unsubstituted hydrocarbon group, such as an aliphatic (e.g., alkyl, alkenyl) group or an aromatic group, or a combination of different $R_2$ and/or $R_3$ groups (such as when multiple different reactive components are used).

As similarly described in more detail below, in embodiments corresponding to a thermoset epoxy composition, the first backbone segments B1 can result from an amine (e.g., mono- or poly-amine; monomer, oligomer, or polymer), the second backbone segments B2 can result from a polysiloxane or other omniphobic polymer (e.g., isocyanate-functional omniphobic polymer), and the third backbone segments B3 can result from a polyepoxide (e.g., monomer, oligomer, or polymer). The first linking groups L1 can include beta-hydroxy (tertiary) amine groups and be represented by the general structure —CH(OH)—$CH_2$—$NR_1R_2$, where $R_1$ and $R_2$ independently can be another beta-hydroxy group or the remainder of the amine thermosetting component. The second linking groups L2 can include urea groups and can be represented by the general structure —$NR_2$—C (═O)—NR$_3$—, where R$_2$ and R$_3$ independently can be H or a C$_1$-C$_{12}$ linear, branched, or cyclic substituted or unsubstituted hydrocarbon group, such as an aliphatic (e.g., alkyl, alkenyl) group or an aromatic group, or a combination of different R$_2$ and/or R$_3$ groups (such as when multiple different reactive components are used).

The first backbone segments B1 generally have a structure corresponding to a (polymerization) reaction product from at least one first thermosetting component after it has reacted with at least one of a second thermosetting component and a functionalized omniphobic polymer having a glass transition temperature (T$_g$) of 70° C. or 50° C. or less (described below). The first backbone segments B1 can result from a single first thermosetting component species or a blend of two or more different first thermosetting component species with the same or different degree of functionality, but each being able to react with the second thermosetting component and the functionalized omniphobic polymer. For example, in embodiments corresponding to a thermoset polyurethane composition, the first backbone segments B1 can have a structure corresponding to at least one of a urethane reaction product and a urea reaction product from at least one polyisocyanate (e.g., diisocyanate, triisocyanate, or higher degree of isocyanate functionality) with a polyol (urethane) or an amine-functional omniphobic polymer (urea). The first backbone segments B1 can result from a single polyisocyanate (e.g., a diisocyanate, a triisocyanate) species or a blend of two or more different polyisocyanate species with the same or different degree of isocyanate functionality. Similarly, in embodiments corresponding to a thermoset epoxy composition, the first backbone segments B1 can have a structure corresponding to at least one of a beta-hydroxy (tertiary) amine product and a urea reaction product from at least one amine (e.g., monoamine, diamine, triamine, or higher degree of isocyanate functionality) with a epoxide (beta-hydroxy amine) or an isocyanate-functional omniphobic polymer (urea). The first backbone segments B1 can result from a single amine (e.g., monoamine, diamine, triamine) species or a blend of two or more different amine species with the same or different degree of amine functionality.

The second backbone segments B2 generally have a structure corresponding to a (polymerization) reaction product from at least one functionalized omniphobic polymer having a glass transition temperature (T$_g$) of 70° C. or 50° C. or less after it has reacted with the first thermosetting component. The functionalized omniphobic polymer includes a functional group reactive with the first thermosetting component (e.g., epoxide group, amino group, isocyanate group, hydroxyl group, carboxylic group). For example, in embodiments corresponding to a thermoset polyurethane composition, the second backbone segments B2 can have a structure corresponding to a urea reaction product from at least one amine-functional omniphobic polymer having a glass transition temperature (T$_g$) of 70° C. or 50° C. or less (e.g., monoamine-functional, diamine-functional, or higher degree of amine functionality) and a polyisocyanate. Similarly, in embodiments corresponding to a thermoset epoxy composition, the second backbone segments B2 can have a structure corresponding to a beta-hydroxy (tertiary) amine reaction product from at least one isocyanate-functional omniphobic polymer having a glass transition temperature (T$_g$) of 70° C. or 50° C. or less (e.g., mono isocyanate-functional, diisocyanate-functional, or higher degree of isocyanate functionality) and an amine (e.g., monoamine, diamine, triamine). In various embodiments, the functionalized omniphobic polymer has a glass transition temperature in a range from −150° C. to 70° C. or 50° C. (e.g., at least −150° C., −120° C., −100° C., or −50° C. and/or up to −10° C., 0° C., 10° C., 20° C., 30° C., 40° C., 50° C., 60° C., or 70° C.). The functionalized omniphobic polymer can be either in a liquid or a rubbery state at common use temperatures of the final coating, for example in a range from 10° C. to 40° C. or 20° C. to 30° C. In various embodiments, the functionalized omniphobic polymer is a liquid at a temperature in a range from 10° C. to 40° C. (e.g., from 20° C. to 30° C., or about room temperature, such as where the functionalized omniphobic polymer has a melting temperature (T$_m$) below 10° C. or 20° C.). The functional groups (e.g., amino, isocyanate, hydroxyl, carboxylic) can be terminal and/or pendant from the omniphobic polymer. In an embodiment, the functional groups are terminal groups on a omniphobic polymer (e.g., linear omniphobic polymer with one or two terminal functional groups). The second backbone segments B2 can result from a single functionalized omniphobic polymer species or a blend of two or more different functionalized omniphobic polymer species with the same or different degree of functionality. The functionalized omniphobic polymer can generally include one or more of functionalized polysiloxanes, functionalized polyperfluoroethers, functionalized polybutadienes, functionalized poly(ethylene glycol) methyl ether ("PEO"), functionalized polyisobutylene ("PIB"), functionalized branched polyolefins, functionalized low molecular weight polyolefins, functionalized polyacrylates and polymethacrylates (e.g., also including C$_2$-C$_{16}$ pendant alkyl groups), and any other omniphobic polymer with a glass transition temperature of 70° C. or 50° C. or less. In an embodiment, the functionalized omniphobic polymer, the second backbone segments B2, and/or the corresponding omniphobic composition can be free from fluorine or fluorinated components (e.g., not using functionalized polyperfluoroethers or other fluorine-containing components during synthesis).

The third backbone segments B3 generally have a structure corresponding to a (polymerization) reaction product from at least one second thermosetting component after it has reacted with the first thermosetting component. The third backbone segments B3 can result from a single second thermosetting component species or a blend of two or more different second thermosetting component species with the same or different degree of functionality, but each being able to react with the first thermosetting component. For example, in embodiments corresponding to a thermoset polyurethane composition, the third backbone segments B3 can have a structure corresponding to a urethane reaction product from at least one polyol (e.g., diol, triol, or higher degree of hydroxyl functionality) and a polyisocyanate. The third backbone segments B3 can result from a single polyol species or a blend of two or more different polyol species with the same or different degree of hydroxyl functionality. Similarly, in embodiments corresponding to a thermoset epoxy composition, the third backbone segments B3 can have a structure corresponding to a beta-hydroxy (tertiary) amine product from at least one amine (e.g., monoamine, diamine, triamine, or higher degree of isocyanate functionality) with a epoxide (beta-hydroxy amine). The third backbone segments B3 can result from a single epoxide species or a blend of two or more different amine epoxide with the same or different degree of epoxide functionality.

The first linking groups L1 have a structure corresponding to a reaction product of a first functional group of the first thermosetting component and a second functional group of the second thermosetting component. The second linking groups L2 have a structure corresponding to a reaction product of the first functional group of the first thermosetting component and a third functional group of the functionalized omniphobic polymer. The first, second, and third functional groups generally can be selected from isocyanate, hydroxy, amino, epoxide, and carboxylic groups. In certain embodiments, the first functional group, the second functional group, and the third functional group are different from each other, (e.g., isocyanate, hydroxy, and amino, respectively, for thermoset polyurethane with an amino-functional omniphobic polymer; amino, epoxide, and isocyanate respectively for a thermoset epoxy with an isocyanate-functional omniphobic polymer). For example, in embodiments corresponding to a thermoset polyurethane composition, The first linking groups L1 can have a structure corresponding to a urethane reaction product of a polyisocyanate as the first thermosetting component (i.e., with an isocyanate group as the first functional group) and a polyol as the second thermosetting component (i.e., with a hydroxyl group as the second functional group), and the second linking groups L2 can have a structure corresponding to a urea reaction product of the polyisocyanate as the first thermosetting component and an amine-functional omniphobic polymer as the functionalized omniphobic polymer (i.e., with an amino group as the third functional group). Similarly, in embodiments corresponding to a thermoset epoxy composition, The first linking groups L1 can have a structure corresponding to a beta-hydroxy amine reaction product of an amine as the first thermosetting component (i.e., with an amino group as the first functional group) and a polyepoxide as the second thermosetting component (i.e., with an epoxide group as the second functional group), and the second linking groups L2 can have a structure corresponding to a urea reaction product of the amine as the first thermosetting component and an isocyanate-functional omniphobic polymer as the functionalized omniphobic polymer (i.e., with an isocyanate group as the third functional group).

In some embodiments, the first and third functional groups have a higher reaction rate with each other relative to the first and second functional groups with each other, for example under the same reaction (e.g., drying, heating, and/or curing) conditions. In some embodiments, the second and third functional groups are generally non-reactive. As an illustration and in the context of the representative thermoset polyurethane and thermoset epoxy compositions according the disclosure, the reaction between isocyanate and amino groups is relatively fast, in particular in comparison to a corresponding reaction between isocyanate and hydroxyl groups and a corresponding reaction between amino and epoxide groups. Thus, for a thermoset polyurethane composition, the isocyanate and amino groups (fast reaction) can correspond to the first and third functional groups, respectively, while the isocyanate and hydroxyl groups (slow reaction) can correspond to the first and second functional groups, respectively. Likewise, for a thermoset epoxy composition, the amino and isocyanate groups (fast reaction) can correspond to the first and third functional groups, respectively, while the amino and epoxide groups (slow reaction) can correspond to the first and second functional groups, respectively.

The polyisocyanate is not particularly limited and generally can include any aromatic, alicyclic, and/or aliphatic isocyanates having at least two reactive isocyanate groups (—NCO). Suitable polyisocyanates contain on average 2-4 isocyanate groups. In some embodiments, the polyisocyanate includes a diisocyanate. In some embodiments, the polyisocyanate includes triisocyanate. Suitable diisocyanates can have the general structure (O=C=N)—R—(N=C=O), where R can include aromatic, alicyclic, and/or aliphatic groups, for example having at least 2, 4, 6, 8, 10 or 12 and/or up to 8, 12, 16, or 20 carbon atoms. Examples of specific polyisocyanates include 1,5-naphthylene diisocyanate, 4,4'-diphenylmethane diisocyanate (MDI), hydrogenated MDI, xylene diisocyanate (XDI), tetramethylxylol diisocyanate (TMXDI), 4,4'-diphenyl-dimethylmethane diisocyanate, di- and tetraalkyl-diphenylmethane diisocyanate, 4,4'-dibenzyl diisocyanate, 1,3-phenylene diisocyanate, 1,4-phenylene diisocyanate, one or more isomers of tolylene diisocyanate (TDI, such as toluene 2,4-diisocyanate), 1-methyl-2,4-diiso-cyanatocyclohexane, 1,6-diisocyanato-2,2,4-trimethyl-hexane, 1,6-diisocyanato-2,4,4-trimethyl-hexane, 1-iso-cyanatomethyl-3-isocyanato-1,5,5-trimethyl-cyclohexane, chlorinated and brominated diisocyanates, phosphorus-containing diisocyanates, 4,4'-diisocyanatophenyl-perfluoroethane, tetramethoxybutane 1,4-diisocyanate, butane 1,4-diisocyanate, hexane 1,6-diisocyanate (or hexamethylene diisocyanate; HDI), HDI dimer (HDID), HDI trimer (HDIT), HDI biuret, 1,5-pentamethylene diisocyanate (PDI), PDID (dimer of PDI), PDIT (trimer of PDI), PDI biuret, dicyclohexylmethane diisocyanate, cyclohexane 1,4-diisocyanate, ethylene diisocyanate, phthalic acid bisisocyanatoethyl ester, 1-chloromethylphenyl 2,4-diisocyanate, 1-bromomethylphenyl 2,6-diisocyanate, 3,3-bischloromethyl ether 4,4'-diphenyldiisocyanate, trimethylhexamethylene diisocyanate, 1,4-diisocyanato-butane, 1,2-diisocyanatododecane, and combinations thereof. The polyisocyanate can be biobased or made of synthetic feedstock. Examples of suitable biobased polyisocyanates include pentamethylene diisocyanate trimer, and polyisocyanates formed from base compounds to which isocyanate groups are attached (e.g., via suitable derivatization techniques), including isocyanate-terminated poly(lactic acid) having two or more isocyanate groups, isocyanate-terminated poly(hydroxyalkanaotes) having two or more isocyanate groups, isocyanate-terminated biobased polyesters having two or more isocyanate groups.

The functionalized omniphobic polymer is not particularly limited and generally can include any omniphobic polymer with glass transition temperature of 70° C. or 50° C. or less, such as in a range from −150° C. to 70° C. or 50° C. The functional group of the functionalized omniphobic polymer can include one or more epoxide groups, amino groups, isocyanate groups, hydroxyl groups, and carboxylic groups (e.g., including only one type of functional group). Amine groups in the amino-functional omniphobic polymers can include one or both of a primary amine and a secondary amine (e.g., $R^1NH_2$ and $R^1R^2NH$, respectively, where $R^1$ and $R^2$ can be the same or different groups other than hydrogen, for example hydrocarbon groups). Examples of general classes of functionalized omniphobic polymers include functionalized polysiloxanes, functionalized polyperfluoroethers, functionalized polybutadienes, functionalized polyolefins (e.g., polyethylene, polypropylene, polybutylene), and combinations or mixtures thereof. The functionalized polyperfluoroether (e.g., functionalized polyperfluoropolyethers) can include mono-, di-, or higher functionalized polyperfluoroethers, or a blend of thereof, such as a blend of mono- and di-functional polyperfluorothers. The functionalized polybutadiene can include mono-, di-, or higher functional polybutadienes, or a blend of thereof, such as a blend mono- and di-functional polybutadienes. Many suitable functionalized omniphobic polymers are commercially available (e.g., amine-, isocyanate-, or other functional polydimethylsiloxane (PDMS) with a variety of available degrees of functionality and molecular weights). Omniphobic polymers that are not commercially available in their functionalized form can be functionalized using conventional chemical synthesis techniques, for example including but not limited to hydroamination, thiol-ene Michael reaction of amine-carrying thiols, Mitsunobu reaction, and reductive amination.

The functionalized polysiloxane is not particularly limited and generally can include any polysiloxane having mono-, di-, or higher degrees functionality. In some embodiments, the functionalized polysiloxane includes a mono-functional polysiloxane. In some embodiments, the functionalized polysiloxane includes a di-functional polysiloxane. The polysiloxane can be a polydialklylsiloxane having —Si($R_1R_2$)—O— repeat units, where $R_1$ and $R_2$ independently can be $C_1$-$C_{12}$ linear or branched alkyl groups, $C_4$-$C_{12}$ cycloalkyl groups, unsubstituted aromatic groups, or substituted aromatic groups, in particular where $R_1$ and $R_2$ are methyl groups for a polydimethylsiloxane (PDMS). The functional groups are suitably terminal groups. For example, in an amine-functional polydialklylsiloxane, the structure and terminal groups can be represented by $NH_2$—$R_3$—[Si($R_1R_2$)—O]$_x$—$R_3$—$NH_2$ for a diamine or $NH_2$—$R_3$—[Si($R_1R_2$)—O]$_x$—$R_3$ for a monoamine, where $R_3$ independently can be H (when a terminal group) or $C_1$-$C_{12}$ linear or branched alkyl (when a terminal group or a linker for a terminal amine). The functional groups additionally can be pendant groups, for example in a amine-functional polydialklylsiloxane represented by $R_3$—[Si($R_1R_2$)—O]$_x$—[Si($R_{1'}R_{2'}$)—O]$_y R_3$, where $R_{1'}$ and $R_{2'}$ independently can be the same as $R_1$ and $R_2$, but at least one or both of $R_{1'}$ and $R_{2'}$ independently is a $C_1$-$C_{12}$ linear or branched alkyl linker group with a terminal amine group (e.g., —$NH_2$). Illustrative isocyanate-functional polydialklylsiloxanes can be represented by the foregoing structures with isocyanate groups (—NCO) replacing the amino groups (—$NH_2$). Some examples of functionalized polyslioxanes include functionalized polydimethylsiloxane, functionalized polymethylphenylsiloxane, and functionalized polydiphenylsiloxane.

Some examples of polyperfluoropolyethers with functional group(s) include functionalized poly(n-hexafluoropropylene oxide) (e.g., —($CF_2CF_2CF_2O$)n-)$NH_2$ or —($CF_2CF_2CF_2O$)n-)NCO for amino or isocyanate groups) and functionalized poly(hexafluoroisopropylene oxide) (e.g., —(CF($CF_3$)$CF_2O$)n$NH_2$ or PFPO—$NH_2$; —(CF($CF_3$)$CF_2O$)nNCO or PFPO—NCO). Some examples of functionalized atactic polyolefins include functionalized poly(l-butene), branched polyethylene, poly(cis-isoprene), poly(trans-isoprene), and poly (1-octene). Some examples of functionalized polyacrylates include poly(3-functionalized propyl acrylate). Similarly, mono-functional polymers include mono-functional polyisobutylene (e.g., PIB—$NH_2$; PIB—NCO), mono-functional polypolyethylene glycol (e.g., PEG-$NH_2$, PEG-NCO), mono-functional poly(l-butene) (e.g., PB—$NH_2$, PB—NCO, cis and trans) can also be used as the low-glass transition temperature ($T_g$ less than 70° C. or 50° C.) polymers, either alone or in combination with other functionalized omniphobic polymers.

The functionalized omniphobic polymers can have any suitable molecular weight in view of desired glass transition temperature, for example having a molecular weight ranging from 300 to 50,000 g/mol. In various embodiments, the molecular weight can be at least 300, 800, 1000, 1500, or 2000 and/or up to 1000, 2000, 3000, 5000, or 50,000 g/mol. The molecular weight can be expressed as a number-average or weight-average value in the units of gram/mole (g/mol). Alternatively or additionally, the functionalized omniphobic polymer can have a number of repeat units ranging from 4 to 600 (e.g., at least 4, 10, 12, 15, 20, or 25 and/or up to 12, 15, 20, 30, 40, 60, 200, or 600; such as a (number) average number of repeat units). Some embodiments can include a blend of two or more amine-functionalized omniphobic polymers with different average molecular weights, such as one with 300-1500 g/mol and another with 1500-50,000 g/mol with a higher average molecular weight than the first. Blends of functionalized omniphobic polymers (e.g., differing in molecular weight and/or in degree of functionality) can improve the combination of water- and oil-repellency properties of the final composition. For example, a mono-functional polysiloxane can provide better water and oil repellency than a di-functional polysiloxane. Low MW functionalized polysiloxanes (e.g., PDMS, such as having a MW range of about 800-1200 g/mol or an average MW of about 1000 g/mol) can provide an improved water repellency, while Higher MW functionalized polysiloxanes (e.g., PDMS, such as about 2000 g/mol or above for an average or range of MW) can provide an improved oil repellency.

The polyol is not particularly limited and generally can include any aromatic, alicyclic, and/or aliphatic polyols with at least two reactive hydroxyl/alcohol groups (—OH). Suitable polyol monomers contain on average 2-4 hydroxyl groups on aromatic, alicyclic, and/or aliphatic groups, for example having at least 4, 6, 8, 10 or 12 and/or up to 8, 12, 16, or 20 carbon atoms. In some embodiments, the polyol is a diol. In some embodiments, the polyol is a triol. Examples of specific polyols include one or more of polyether polyols (e.g., polypropylene oxide-based triols such as commercially available MULTRANOL 4011 with a MW of about 300), triethanolamine, hydroxlated (meth)acrylate oligomers (e.g., 2-hydroxylethyl methacrylate or 2-hydroxyethyl acrylate), glycerol, ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, glycerol, trimethylolpropane, 1,2,6-hexanetriol, pentaerythritol, (meth) acrylic polyols (e.g., having random, block, and/or alternating hydroxyl functionalities along with other (meth) acrylic moieties), and isosorbide. The polyol can be biobased or made of synthetic feedstock. Examples of suitable biobased polyols include isosorbide, poly(lactic acid) having two or more hydroxyl groups, poly(hydroxyalkanaotes) having two or more hydroxyl groups, and biobased poly(esters) having two or more hydroxyl groups (e.g., as terminal groups).

The polyepoxide is not particularly limited and generally can include polyepoxide-substituted aromatic hydrocarbons, aliphatic hydrocarbons, cycloaliphatic hydrocarbons, ethers thereof, esters thereof, imines thereof, and combinations thereof. The polyepoxide can include hydrocarbons with two or more epoxide groups and one or more aromatic, aliphatic, cycloaliphatic, ether, ester, and/or imine groups in the hydrocarbon to which the epoxide groups are attached. Suitable polyepoxides can be derived from petroleum and plant materials. Suitable polyepoxides include two or more glycidyl ether groups (i.e., epoxide-containing groups). Some examples of polyepoxides include, but are not limited to, bisphenol A epoxy (e.g., diglycidyl ether of bisphenol A having 1 or 2-25 bisphenol A repeat units), bisphenol F epoxy (e.g., diglycidyl ether of bisphenol F having 1 or 2-25 bisphenol F repeat units), epoxy phenol novolac, epoxy cresol novolac, cycloaliphatic epoxies, halogenated epoxies, epoxy-vinyl esters, tetraglycidylmethylenedianiline (TGMDA), 3,4-epoxycyclohexylmethyl 3,4-epoxycyclohexanecarboxylate (ECC), bis[3,4-epoxycyclohexylmethyl] adipate (BECHMA), poly(glycidyl methacrylate), epoxies of rosin acid, epoxies of diphenolic acid, epoxies of tannin acid, epoxies derived from glucose, isosorbide epoxies, eugenol epoxides, furan epoxides, cathechin epoxides, vanillin-based epoxies, quercetin epoxides, epoxies derived from gallic acid, epoxies from phenols, epoxies from cardanols, epoxies from plant oils, terpene oxides (e.g., limonene dioxide), and combinations thereof.

The amine is not particularly limited and generally can include polyamine-substituted aromatic hydrocarbons, aliphatic hydrocarbons, cycloaliphatic hydrocarbons, ethers thereof, esters thereof, imines thereof, and combinations thereof. The amine can include hydrocarbons with two or more amino groups and one or more aromatic, aliphatic, cycloaliphatic, ether, ester, and/or imine groups in the hydrocarbon to which the amino groups are attached. Suitable amines can be derived either petrochemicals or plant materials. Some examples include, but are not limited to, isophorone diamine, diaminopropyl isosorbide, furfuryl-diamine, polylysine, menthane diamine, tris(dimethylaminomethyl)phenol, melamine, bis(3-aminopropyl)amine, N,N'-bis(3-aminopropyl)-1,3-propanediamine, 3,3'-diamino-N-methyldipropylamine, tris(3-aminopropyl)amine, 1,2-bis(3-aminopropylamino) ethane, diethylenetriamine, polyetheramines (e.g., JEFFAMINE polyetheramines available from Huntsman Chemical). The amines can be primary, secondary, or a combination of both.

In some embodiments including a thermoset polyurethane polymer, at least one of the polyisocyanate and the polyol is a tri- or higher functional isocyanate or alcohol/hydroxy compound, respectively, to promote crosslinking of the backbone segments in the final thermoset polyurethane polymer. Alternatively or additionally, in some embodiments, the functionalized omniphobic polymer is a tri- or higher amine-functional compound (e.g., tri-functional amine PDMS) so that the omniphobic polymer can serve as a crosslinker, either alone or in combination with polyisocyanate and/or polyol crosslinkers.

In some embodiments including a thermoset epoxy polymer, at least one polyepoxide has a functionality greater than two or at least one amine has a functionality greater than one promote crosslinking of the backbone segments in the final epoxy polyurethane polymer. Specifically, since a single primary amino group can react with two epoxide groups, either some species with three or more epoxide groups or two or more amino groups (which can form four or more bonds with epoxides) are used for crosslinking. Typically a diepoxide and a diamine are used. Alternatively or additionally, in some embodiments, the functionalized omniphobic polymer is a tri- or higher isocyanate-functional compound (e.g., tri-functional isocyanate PDMS) so that the omniphobic polymer can serve as a crosslinker, either alone or in combination with polyepoxide and/or amine crosslinkers.

The first, second, and third backbone segments can be incorporated into the thermoset polymer in a variety of relative weight amounts. In an embodiment, the first backbone segments are present in an amount ranging from 10 wt. % to 90 wt. % relative to the thermoset polymer (e.g., at least 10, 15, or 20 wt. % and/or up to 30, 40, 50, 60, 70, 80, or 90 wt. %; such as 30 wt. % to 70 wt. %), which amounts can equivalently correspond to the first thermosetting component(s), for example as added to a reaction mixture and relative to all monomeric, oligomeric, and polymeric reaction components added thereto. In an embodiment, the second backbone segments are present in an amount ranging from 0.01 wt. % to 20 wt. % relative to the thermoset polymer (e.g., at least 0.01, 0.1, 0.2, 0.5, 1, 2, 3, or 5 wt. % and/or up to 3, 5, 8, 10, 15 or 20 wt. %; such as 0.2 wt. % to 8 wt. % or 1 wt. % to 5 wt. %), which amounts can equivalently correspond to the functionalized omniphobic polymer(s), for example as added to a partially crosslinked reaction product already on a substrate and relative to all monomeric, oligomeric, and polymeric reaction components added thereto. In an embodiment, the third backbone segments are present in an amount ranging from 10 wt. % to 90 wt. % relative to the thermoset polymer (e.g., at least 10, 20, 30, 40, or 50 wt. % and/or up to 70, 80, or 90 wt. %, such as 30 wt. % to 70 wt. %), which amounts can equivalently correspond to the second thermosetting component(s), for example as added to a reaction mixture and relative to all monomeric, oligomeric, and polymeric reaction components added thereto.

Similarly, the first, second, and third backbone segments can be incorporated into the thermoset polymer in a variety of relative molar amounts based on the corresponding reactive functional groups of their corresponding monomeric, oligomeric, and polymeric reaction components. Suitably, approximately a 1:1 molar ratio of combined second and third functional groups (e.g., hydroxy and amino groups, respectively; epoxide and isocyanate groups, respectively) relative to first functional groups (e.g., isocyanate groups; amino groups) is used when combining reactive components to make the omniphobic composition. In most cases, first functional groups are added in a slight molar excess. Final molar ratios of (i) first functional groups to (ii) second and third functional groups combined are typically between 1:1 to 1.6:1, for example at least 1:1, 1.1:1, or 1.2:1 and/or up to 1.4:1, 1.5:1, or 1.6:1.

In an embodiment, the thermoset polymer crosslinked backbone can include further types of backbone segments. For example, the backbone can include fourth backbone segments which have a structure corresponding to a reaction product of a mono-functional monomer component having only one first functional group reactive with the second thermosetting component or the functionalized omniphobic polymer. Such mono-functional monomers can be applied to the substrate in combination with the first and second thermosetting components when forming the partially crosslinked reaction product. The mono-functional monomer component can be, for example, a monoisocyanate or a monoepoxide, which can be used as a means to control crosslinking degree as well as to incorporate hydrophobic or other functional groups at an external or boundary portion of the thermoset polymer. Examples of monoisocyanates include R—(N=C=O) and examples of monoepoxides include R—($C_2H_4O$) (i.e., oxirane or epoxide group), where R can include aromatic, alicyclic, and/or aliphatic groups, for example having at least 2, 4, 6, 8, 10 or 12 and/or up to 8, 12, 16, or 20 carbon atoms. The fourth backbone segments can be present in an amount ranging from 0.01 wt. % to 4 wt. % relative to the thermoset polymer (e.g., at least 0.01, 0.1, 0.2, or 0.5 wt. % and/or up to 1, 2, or 4 wt. %), which amounts can equivalently correspond to the mono-functional monomer component, for example as added to a reaction mixture and relative to all monomeric, oligomeric, and polymeric reaction components added thereto.

In an embodiment, the thermoset omniphobic composition can include any suitable organic or inorganic filler or additive, which can be included to improve one or more of mechanical properties, optical properties, electrical properties, and omniphobic properties of the final composition. Examples of suitable fillers or additives include nanoclay, graphene oxide, graphene, silicon dioxide (silica), aluminum oxide, diatomaceous earth, cellulose nanocrystals, carbon nanotubes, titanium dioxide (titania), and combinations or mixtures thereof. In addition, the fillers can include biocides, pigments, dyes, a thermoplastic material, or a combination thereof. The fillers can be added in the range from 0.01 wt. % to 10 wt. %, for example in range from 1 wt. % to 5 wt. %. The presence of organic or inorganic fillers in the omniphobic composition can affect the clarity of the resulting composition, in which case the amount and size of the fillers can be selected in view of the desired clarity properties of the composition as well as the mechanical, electrical, omniphobic or other functional properties of the final composition.

The omniphobic properties of the thermoset composition (e.g., for the cured composition) can be characterized in terms of one or more contact angles and/or sliding angles for water and/or oil droplets (e.g., vegetable oil and/or hexadecane) on the thermoset composition (e.g., as a coating on a substrate). The following ranges are representative of compositions according to the disclosure which display favorable omniphobic properties. In an embodiment, the composition has a water contact angle in a range from 90° to 120° (e.g., at least 90°, 95°, 100°, or 105° and/or up to 110°, 115°, or 120°; such as for the cured composition as a coating). In some cases, the water contact angle can be up to about 125° for non-smooth or rough surfaces. In an embodiment, the composition has an oil contact angle in a range from 0° or 1° to 65° (e.g., at least 1°, 10°, 20°, or 30° and/or up to 40°, 50°, 60°, or 65°; such as for the cured composition as a coating). In an embodiment, the composition has a water sliding angle in a range from 0° or 1° to 30° for a 75 µl droplet (e.g., at least 1°, 2°, 4°, 6°, or 8° and/or up to 10°, 15°, 20°, or 30°; such as for the cured composition as a coating). In an embodiment, the composition has an oil sliding angle in a range from 0° or 1° to 20° for a 25 µl droplet (e.g., at least 1°, 2°, 4°, 6°, or 8° and/or up to 10°, 12°, 15°, or 20°; such as for the cured composition as a coating). The contact angles for the omniphobic coatings can be higher when nanofillers (e.g., clay, silica, etc.) are included in the composition as compared to corresponding compositions without any nanofillers.

Figure 5:
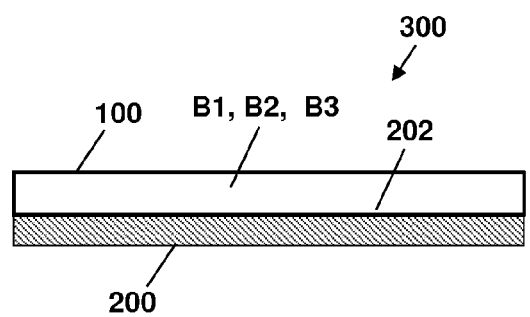
FIG. 5 illustrates a coated article according to the disclosure in which the thermoset omniphobic composition has a homogeneous structure.

The thermoset omniphobic composition generally has a homogeneous structure, for example a homogenous thermoset solid with the first, second, and third backbone segments being generally evenly distributed throughout the composition. This is illustrated in FIG. 5 with the thermoset omniphobic composition 100 shown as a homogeneous coating on a substrate 200 with the backbone segments B1, B2, B3 distributed throughout. This is in contrast to a common "self-stratified" structure with a siloxane (or other hydrophobic or omniphobic polymer group) rich surface and bulk thermoset region with little or no siloxane (or other hydrophobic or omniphobic polymer group). The homogeneous structure can result from the formation of a partially crosslinked matrix between the first and second thermosetting components that allows the functionalized omniphobic polymer such as polysiloxane to be absorbed and permeate into the partially crosslinked matrix to promote its uniform distribution in the final matrix. The presence of complementary reactive groups in the partially crosslinked matrix (e.g., unreacted amino or isocyanate groups for epoxy and polyurethane monomers, respectively, in the first thermosetting component) as well as the functionalized omniphobic polymer (e.g., isocyanate or amino groups for PDMS-NCO or PDMS-NH$_2$) allows the functionalized omniphobic polymer to react and form covalent bonds with the matrix components as the partially crosslinked matrix becomes a fully cured thermoset omniphobic composition with all three backbone segments.

Coated Article

FIG. 5 illustrates an aspect of the disclosure in which a coated article 300 (e.g., desirably having omniphobic properties on at least one surface thereof) includes a substrate 200 and the thermoset omniphobic composition 100 coated on a surface 202 of the substrate 200. The composition 100 can be in the form of a coating or film on an external, environment-facing surface 202 of the substrate 200 (e.g., where the surface 202 would otherwise be exposed to the external environment in the absence of the composition 100). In this case, the thermoset omniphobic composition 100 provides omniphobic protection to the underlying substrate 200.

The substrate 200 is not particularly limited, and generally can be formed from any material desired for protection with an omniphobic coating, in particular given the good, broad adhesive capabilities of the thermoset omniphobic composition 100. For example, the substrate can be a metal, plastic, a different thermoset material (e.g., a primer material; material other than the other than thermoset omniphobic composition), glass, wood, fabric (or textile), or ceramic material. Examples of specific metals include steel, aluminum, copper, etc. Examples of specific plastics include polyvinyl alcohol (PVOH), ethylene vinyl alcohol (EVOH), polyethylene terephthalate (PET), polypropylene (PP), polyethylene (PE), starch, chitosan, etc. Suitable wood materials can be any type of wood commonly used in home, office, and outdoor settings. Suitable glass materials can be those used for building windows, automobile windows, etc. In some embodiments, the substrate 200 is a top layer of a coating or series of coatings on a different underlying substrate. For example, the coated article can include a substrate 200 material as generally disclosed herein, one or more intermediate coatings on the substrate 200 (e.g., an epoxy coating, an acrylic coating, another primer coating, etc.), and the thermoset omniphobic composition 100 on the one or more intermediate coatings as the final, external coating on the coated article 300.

The thermoset omniphobic composition 100 can have any desired thickness on the substrate 200. In common applications, the composition 100 has a thickness ranging from 0.010 µm to 500 µm, for example at least 0.01, 10, 20, 50, or 100 µm and/or up to 200, 500 µm. Typical cast coatings can have thicknesses of 10 µm to 100 µm. Typical spin coatings can have thicknesses of 0.05 µm or 0.10 µm to 0.20 µm or 0.50 µm. Multiple coating layers can be applied to substrate 200 to form even thicker layers of the composition 100 (e.g., above 500 µm or otherwise) if desired.

Method of Making the Composition and Coated Article

The thermoset omniphobic composition according to the disclosure generally can be formed as illustrated in FIG. 3. At least one first thermosetting component as described above and at least one second thermosetting component reactive therewith and as described above are applied to a substrate 200, in particular a top or exposed surface 202 thereof, for example in the form of a mixture 110 as illustrated. The mixture 110 can further include a casting or other solvent for the thermosetting components, catalysts, organic and/or inorganic fillers, etc. The mixture 110 can include a suitable reaction or casting solvent or medium, for example an aprotic organic solvent such as acetone, tetrahydrofuran, 2-butanone, other ketones (e.g., methyl n-propyl ketone, methyl isobutyl ketone, methyl ethyl ketone, ethyl n-amyl ketone), esters (e.g., $C_1$-$C_4$ alkyl esters of $C_1$-$C_4$ carboxylic acids, such as methyl, ethyl, n-propyl, butyl esters of acetic acid such as n-butyl acetate, etc.), n-butyl propionate, ethyl 3-ethoxy propionate), dimethylformamide, dimethyl carbonate, etc. In some cases, a mixture of two or more solvents can be used for the initial application and subsequent partial crosslinking reaction. In some embodiments, a reaction catalyst can be added to the mixture 110 to catalyze the reaction between the thermosetting components (e.g., polyisocyanate and polyol for a polyurethane). Various commercial and laboratory-synthesized catalysts can be used, for example including, but not limited to, complexes and/or salts of tin (e.g., tin(II) 2-ethylhexanoate) or iron, and tertiary amines (e.g., triethylamine), 1,8-Diazabicyclo[5.4.0]undec-7-ene (DBU) and 1,4-Diazabicyclo[2.2.2]octane (DABCO). The mixture 110 can be applied to the substrate 200 using any suitable method, such as by casting, spraying, rolling and/or dipping.

The first and second thermosetting components are then reacted with each other to form a partially crosslinked reaction product 120 on the substrate 200. The partially crosslinked reaction product 120 includes at least some covalent bonds between the first thermosetting component and the second thermosetting component, and at least some unreacted functional groups reactive with the functionalized omniphobic polymer. The partially crosslinked structure of the reaction product 120 permits subsequent application, absorption, and permeation of the functionalized omniphobic polymer into and throughout the product 120 as a preliminary coating on the substrate 200. Reaction to form the partially crosslinked reaction product 120 generally can be performed at any suitable reaction temperature(s) and time(s), which can be selected such that there is sufficient time to partially (but not completely) crosslink/cure the components of the reaction mixture 110, thus leaving some unreacted functional groups for eventual full curing/crosslinking in the final thermoset composition. In an embodiment, reaction to form the partially crosslinked reaction product is performed (i) at temperature from 20° C., 30° C., 40° C., or 60° C. to 80° C., 100° C., 120° C., or 150° C. and (ii) for a time from 1 min or 5 min to 120 min or 300 min. Thus, reaction can be performed with or without heating the reaction mixture. Room-temperature (e.g., 20° C. to 30° C.) reactions are possible with longer reaction times and/or the addition of a catalyst. Initial reaction between the first thermosetting component and the second thermosetting component can be relatively slow and can involves heating and/or the use of a catalyst. In contrast, the subsequent reaction between the first thermosetting component and the functionalized omniphobic polymer can be very fast and need not be heated for suitable reaction times in various embodiments.

In some embodiments, after applying the first and second thermosetting components the substrate 200, the substrate 200 can be dried to remove solvent present in the corresponding mixture 110, thereby forming a coating of the first thermosetting component and the second thermosetting component on the substrate 200 (e.g., which can include some partial crosslinking between the thermosetting components as a result of the drying). Drying is generally performed at ambient conditions and before heating to accelerate the reaction to form the partially crosslinked reaction product. However, some reaction/partial crosslinking between the first and second thermosetting components can occur during drying, but the majority of reaction occurs after solvent removal. In certain cases, partial crosslinking can be performed under ambient conditions without heating the samples prior to application of the functionalized omniphobic polymer.

At least one functionalized omniphobic polymer is then applied to the partially crosslinked reaction product 120 (e.g., a top or exposed surface thereof), for example in the form of a mixture 130 as illustrated. The mixture 130 can further include a casting or other solvent for the functionalized omniphobic polymer. The solvent of the mixture 130 can be the same or different as that for the mixture 110. The mixture 130 can be applied to the partially crosslinked reaction product 120 using any suitable method, such as by casting, spraying, rolling and/or dipping. The unreacted functional groups in the partially crosslinked reaction product 120 are reacted with the functionalized omniphobic polymer in the mixture 130 to form the thermoset omniphobic coating 100 on the substrate 200 as illustrated. Such reaction or curing can be performed by heating (e.g., in an oven, with exposure to a heat lamp, etc.) at a temperature from 80° C. or 100° C. to 140° C. or 180° C. and/or for a time from 1 hr to 24 hr. Lower heating temperature or ambient temperature curing is also possible, such as room temperature curing (e.g., 20° C. to 30° C.) for 4 hr-240 hr or 5-10 days (e.g., at least 4, 8, 12, 16, or 24 hr and/or up to 12, 16, 24, 48, 72, 96, 120, or 240 hr), lower heating (e.g., 30° C. or 40° C. to 60° C. for 4 hr-96 hr or 2-4 days or 60° C. to 80° C. for 1 hr-72 hr or 1-3 days).

In some embodiments, after applying the functionalized omniphobic polymer to the partially crosslinked reaction product 120, the substrate 200 can be dried to remove the solvent from the mixture 130. Drying is generally performed at ambient conditions and before heating to accelerate the reaction to form the fully cured/crosslinked thermoset omniphobic coating. However, some reaction/further crosslinking between the first and second thermosetting components as well as the functionalized omniphobic polymer can occur during drying, but the majority of reaction generally occurs after solvent removal. Drying also provides some time for the functionalized omniphobic polymer as applied to the external surface of the partially crosslinked reaction 120 product to penetrate into the interior of the partially crosslinked reaction product 120 coating. Depending on the thickness of the partially crosslinked reaction product 120 coating and the drying time before full curing (e.g., either due to application of heat or at low/ambient temperatures such as with a catalyst), the functionalized omniphobic polymer can be incorporated into either an exterior/top region of the final thermoset omniphobic coating 100, or it can be distributed substantially throughout the thermoset omniphobic coating 100. For example, with sufficient drying time and/or sufficiently thin partially crosslinked reaction product 120 coatings, the functionalized omniphobic polymer can penetrate essentially completely through the coating to the substrate 200 prior to curing. The functionalized omniphobic polymer in the mixture 130 as applied to the top layer of the partially crosslinked coating 120 will generally diffuse through the coating (e.g., as illustrated in the top right panel of FIG. 3). The functionalized omniphobic polymer can be very reactive with the unreacted (first) thermosetting component functional groups, and as a result, the relative degree of incorporation of the functionalized omniphobic polymer (e.g., as a local weight fraction or percent) can exhibit a normal concentration gradient that gradually decreases from the outer surface of the final coating 100 towards the bottom of the final coating adjacent to the substrate 200 and original exposed surface 202.

EXAMPLES

The following examples illustrate the disclosed compositions and methods, but are not intended to limit the scope of any claims thereto. In the following examples, thermoset omniphobic compositions generally according to the disclosure are prepared and applied as a film or coating on a test substrate such as glass. The applied films or coatings can then be evaluated according to a variety of tests as described below in order to characterize their relative degree of omniphobicity.

Figure 1:
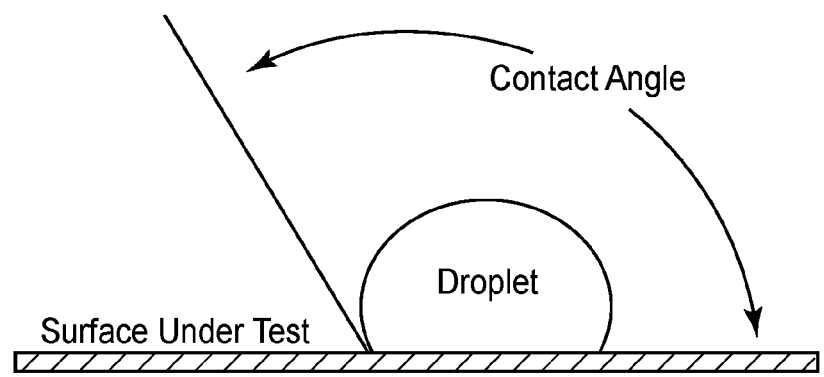
FIG. 1 is a diagram illustrating measurement of a contact angle for a liquid droplet on a surface.
Figure 2:
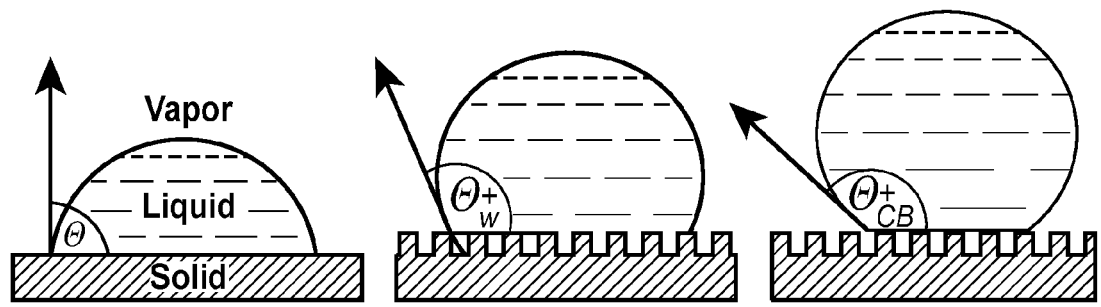
FIG. 2 is a diagram illustrating how contact angles for a given liquid droplet on a surface can vary as a function of surface topology (e.g., flat or smooth surface vs. textured surfaces).

Contact Angle: Contact angles (see FIG. 1) are determined by applying a liquid droplet on a test coating surface that is stationary and horizontal with respect to gravity. Any specified liquids can be used, but omniphobic coatings are generally characterized by determining contact angles for water droplets and separately for oil droplets (e.g., a cooking or other common vegetable oil, hexadecane or other oily liquid hydrocarbon). The applied droplets have a volume of about 5 µl (e.g., about 3 µl to 10 µl), although the measured contact angle is not particularly sensitive to actual droplet volume in these ranges. Once applied to the test coating, the droplet can be visually interrogated through any suitable means to determine the contact angle (e.g., using conventional digital image photography and digital image analysis). Suitably, (cured) omniphobic composition coatings according to the disclosure have a water contact angle in a range from 90° to 120° (e.g., at least 90°, 95°, 100°, or 105° and/or up to 110°, 115°, or 120°). Suitably, (cured) omniphobic composition coatings according to the disclosure have an oil contact angle in a range from 10° to 65° (e.g., at least 10°, 20°, or 30° and/or up to 40°, 50°, 60°, or 65°).

Sliding Angle: Sliding angles are determined by applying a liquid droplet on a test coating surface that is initially horizontal with respect to gravity. The test coating surface is then gradually ramped at a controlled/known angle relative to the horizontal plane. Droplets which do not initially spread will remain stationary on the test surface until the test surface is ramped to a sufficiently high angle to cause the droplets to slide down the ramped test surface. The test surface angle at which sliding begins is the sliding angle of the test coating. Any specified liquids can be used, but omniphobic coatings are generally characterized by determining contact angles for water droplets and separately for oil droplets (e.g., a cooking or other common vegetable oil, hexadecane or other oily liquid hydrocarbon). The applied droplets have a specified volume, which is generally about 75 µl (e.g., about 50 µl to 150 µl) for water and about 20 µl (e.g., about 5 µl to 40 µl) for oil. Once applied to the test coating, the droplet can be visually interrogated through any suitable means to determine the sliding angle (e.g., using conventional digital image photography and digital image analysis). Suitably, (cured) omniphobic composition coatings according to the disclosure have a water sliding angle in a range from 0° or 1° to 30° (e.g., at least 1°, 2°, 4°, 6°, or 8° and/or up to 10°, 15°, 20°, or 30°). Suitably, (cured) omniphobic composition coatings according to the disclosure have an oil contact angle in a range from 0° or 1° to 20° (e.g., at least 1°, 2°, 4°, 6°, or 8° and/or up to 10°, 12°, 15°, or 20°).

Scratch Resistance: Scratch resistance is evaluated on a scale of 1 (worst) to 5 (best) by attempting to scratch a test coating surface using materials of various hardness, such as a human fingernail, the corner/edge of a glass slide, a metal (e.g., stainless steel) knife, etc. The test surface is rated as "1" for a given scratching material if there is substantial damage or delamination of the test coating surface after being scratched. The test surface is rated as "5" for a given scratching material if there is no observable damage or marking on the test coating surface after being scratched. These qualitative numbers were obtained based on the criteria including: 1) the depth of the scratch, 2) is scratch damaging the surface, and 3) whether the scratch be felt if touched by hand.

Permanent Ink Resistance: Permanent ink resistance is evaluated on a scale of 1 (worst) to 5 (best) by applying an ink marking on a test coating surface using a permanent ink marker (e.g., SHARPIE permanent ink marker or equivalent) and then attempting to wipe off the marking using a tissue (e.g., KIMWIPE laboratory cleaning tissue or equivalent). The test surface is rated as "1" if all of the ink marking remains on the test coating surface after being wiped. The test surface is rated as "5" if all of the ink marking is removed from the test coating surface after being wiped. These numbers give an estimation of the ink-resistance, which are qualitatively assigned by taking two aspects in consideration: 1) the amount of ink left behind after a single wipe of the sample, and 2) the ink left behind after multiple wipes of the sample.

Optical Properties/Transmittance or Clarity: The optical transmittance (or clarity) of a sample film was tested using a Perkin Elmer Lambda 25 UV-Vis spectrometer, and the result was rated on a scale from 1 (worst) to 5 (excellent), with a reference glass having 100% transmittance as a reference:

| Rating | Optical Transmittance |
|---|---|
| 5 | >95% |
| 4 | 90-94%. |
| 3 | 81-89% |
| 2 | 70-80% |
| 1 | <70% |

The following examples provides experimental details for the formation of epoxy and polyurethane substrate coatings for (a) partially cured epoxy and polyurethane coatings that are modified with a functionalized PDMS applied to the top coating surface prior to full curing, (b) epoxy and polyurethane coatings that are modified with a functionalized PDMS mixed in situ with the thermosetting monomers prior to application and curing of the coating, and (c) comparative epoxy and polyurethane coatings that are not modified with a functionalized PDMS. In terms of coating clarity, anti-ink resistance, scratch resistance, water repellency, and oil repellency, the coated substrates are generally ranked (a), (b), (c) in terms of favorable performance. The examples further illustrate the including of various fillers and reaction solvents for the disclosed methods and resulting articles/compositions.

Example 1—Epoxy Coating Systems with and without Top-Layer PDMS Functionalization Example 1 illustrates thermoset epoxy omniphobic coatings according to the disclosure and including an epoxide thermosetting component, an amine thermosetting component, and an isocyanate-functional PDMS omniphobic polymer (Samples 1.1-1.4). Example 1 further illustrates comparative thermoset epoxy coatings including an epoxide thermosetting component and an amine thermosetting component, but no isocyanate-functional PDMS omniphobic polymer (Samples 1.5-1.8).

Sample 1.1: Bisphenol A (BPA) diglycidyl ether (180 mg) was dissolved in 1 mL acetone and then to this solution JEFFAMINE~230 polyetheramines (60 mg) was added and sonicated at 60° C. for 1 hr. The resulting solution was then casted on glass slides and left for solvent evaporation. After complete evaporation it was partially cured for 5 min at 120° C. and then allowed to cool down. Then an isocyanate-functional PDMS (PDMS-NCO; 2K molecular weight; 25 mg/4 mL solution in acetone) was added with a syringe to top of the partially cured coting. It was then left for solvent evaporation and then cured at 120° C. for 12 h in oven for curing.

Sample 1.2: BPA diglycidyl ether (180 mg) was dissolved in 1 mL acetone and then to this solution JEFFAMINE~230 (60 mg) was added and sonicated at 60° C. for 20 min. Then to this solution 4 mg nanoclay (dispersed in 0.2 mL acetone) was added and again sonicate at 60° C. for 1 hr. The resulting solution was then casted on glass slides and left for solvent evaporation. After complete evaporation it was partially cured for 5 min at 120° C. and then allowed to cool down. Then on its top layer PDMS-NCO (2K) (25 mg/4 mL acetone) was added with a syringe. It was then left for solvent evaporation and then cured at 120° C. for 12 h in oven.

Sample 1.3: BPA diglycidyl ether (180 mg) was dissolved in 1 mL acetone and then to this solution JEFFAMINE-230 (60 mg) was added and sonicated at 60° C. for 20 min. Then to this solution 4 mg cellulose nanocrystal (dispersed in 0.2 mL acetone) was added and again sonicate at 60° C. for 1 hr. The resulting solution was then casted on glass slides and left for solvent evaporation. After complete evaporation it was partially cured for 5 min at 120° C. and then allowed to cool down. Then on its top layer PDMS-NCO (2K) (25 mg/4 mL acetone) was added with help of syringe. It was then left for solvent evaporation and then cured at 120° C. for 12 hrs in oven.

Sample 1.4: BPA diglycidyl ether (180 mg) was dissolved in 1 mL acetone and then to this solution JEFFAMINE~230 (60 mg) was added and sonicated at 60° C. for 20 min. Then to this solution 4 mg Graphene oxide (dissolved in 0.3 mL acetone) was added and again sonicate at 60° C. for 1 hr. The resulting solution was then casted on glass slides and left for solvent evaporation. After complete evaporation it was partially cured for 5 min at 120° C. and then allowed to cool down. Then on its top layer PDMS-NCO (2K) (25 mg/4 mL acetone) was added with help of syringe. It was then left for solvent evaporation and then cured at 120° C. for 12 hrs in oven.

Sample 1.5: BPA diglycidyl ether (180 mg) was dissolved in 1 mL acetone and then to this solution JEFFAMINE~230 (60 mg) was added and sonicated at 60° C. for 1 hr. The resulting solution was then casted on glass slides and left for solvent evaporation. After complete evaporation it was then cured at 120° C. for 12 h in oven. (Reference for Sample 1.1)

Sample 1.6: BPA diglycidyl ether (180 mg) was dissolved in 1 mL acetone and then to this solution JEFFAMINE~230 (60 mg) was added and sonicated at 60° C. for 20 min. Then to this solution 4 mg nanoclay (dispersed in 0.2 mL acetone) was added and again sonicate at 60° C. for 1 hr. The resulting solution was then casted on glass slides and left for solvent evaporation. After complete evaporation it was cured at 120° C. for 12 h in oven. (Reference for Sample 1.2)

Sample 1.7: BPA diglycidyl ether (180 mg) was dissolved in 1 mL acetone and then to this solution JEFFAMINE~230 (60 mg) was added and sonicated at 60° C. for 20 min. Then to this solution 4 mg cellulose nanocrystal (dispersed in 0.2 mL acetone) was added and again sonicate at 60° C. for 1 hr. The resulting solution was then casted on glass slides and left for solvent evaporation. After complete evaporation it was then cured at 120° C. for 12 hrs in oven. (Reference for Sample 1.3)

Sample 1.8: BPA diglycidyl ether (180 mg) was dissolved in 1 mL acetone and then to this solution JEFFAMINE~230 (60 mg) was added and sonicated at 60° C. for 20 min. Then to this solution 4 mg Graphene oxide (dispersed in 0.3 mL acetone) was added and again sonicate at 60° C. for 1 hr. The resulting solution was then casted on glass slides and left for solvent evaporation. After complete evaporation it was then cured at 120° C. for 12 hrs in oven. (Reference for Sample 1.4)

Results: The samples were evaluated for clarity, ink resistance, scratch resistance, contact angles, and sliding angles as generally described above. For Samples 1.1-1.3 and 1.5-1.7, the clarity was more than 85% (ranked as 5 on the scale of 1-5, where 5 is best). Samples 1.4 and 1.8 had transmittance values of 81% (rank 3) and 95% (rank 5), respectively. On a scale of 1-5, where 5 is best, the anti-ink properties for Samples 1.1-1.4 was 5, while for Samples 1.5-1.8, the anti-ink performance was 1. On a scale of 1-5, where 5 is best, the scratch resistance properties for Samples 1.1-1.8 were 5. For Samples 1.1-1.4, water droplets (size 75 µL) had a sliding angle in the range 14-17±3°. For Samples 1.1-1.4, water contact angle (size 5 µL) was in the range 104-107±1°. For Samples 1.1-1.4, hexadecane droplets (size 5 µL) had a sliding angle in the range 6-9±1°. For Samples 1.1-1.4, hexadecane droplet (size 5 µL) contact angle was in the range 30-54±2°. For Samples 1.5-1.8, water droplets (size 75 µL) had a sliding angle in the range 28-31±1°. For Sample 1.5-1.8, hexadecane droplets (size 5 µL) exhibited tailing (wetting).

Example 2—Epoxy Coating Systems with In-Situ Mixing of PDMS Functionalization

Example 3 illustrates thermoset epoxy omniphobic coatings including an epoxide thermosetting component, an amine thermosetting component, and an isocyanate-functional PDMS omniphobic polymer, but without first forming a partially crosslinked coating that is subsequently functionalized with the PDMS omniphobic polymer (Samples 2.1-2.3).

Sample 2.1: BPA diglycidyl ether (180 mg) was dissolved in 1 mL acetone and then to this solution JEFFAMINE-230 (60 mg) followed by addition of 5 mg PDMS NCO (2K) (dissolved in 0.25 mL acetone) was added and sonicated at 60° C. for 1 hr. The resulting solution was then cast on glass slides and left for solvent evaporation. After complete evaporation it was then cured at 120° C. for 12 hrs in oven.

Sample 2.2: BPA diglycidyl ether (180 mg) was dissolved in 1 mL acetone and then to this solution JEFFAMINE~230 (60 mg) followed by 4 mg nanoclay (dispersed in 0.2 mL acetone) addition and then to this solution 5 mg PDMS NCO (2K) (dissolved in 0.25 mL acetone) was added and sonicate at 60° C. for 1 hr. The resulting solution was then casted on glass slides and left for solvent evaporation and then cured at 120° C. for 12 hrs in oven.

Sample 2.3: BPA diglycidyl ether (180 mg) was dissolved in 1 mL acetone and then to this solution JEFFAMINE~230 (60 mg) followed by 4 mg CNC (dispersed in 0.2 mL acetone) addition. Then to this solution 5 mg PDMS NCO2 (2K) (dissolved in 0.25 mL acetone) was added and sonicate at 60° C. for 1 hr. The resulting solution was then casted on glass slides and left for solvent evaporation and then cured at 120° C. for 12 hrs in oven.

Results: The samples were evaluated for clarity, ink resistance, scratch resistance, contact angles, and sliding angles as generally described above. For Samples 2.1-2.3, the clarity was ranked as 3 on the scale of 1-5, where 5 is best. On a scale of 1-5, where 5 is best, the scratch resistance properties for Samples 2.1-2.3 was 5. On a scale of 1-5, where 5 is best, the anti-ink properties for Samples 2.1-2.3 were 3. For Samples 2.1 and 2.3, water droplets (size 75 μL) had sliding angles in the range 17-20±3° while Sample 2.2 had water sliding angles at 15±3°. For Samples 2.1-2.3, hexadecane droplets (size 5 μL) wet the surface (exhibiting tailing upon sliding).

Example 3—Polyurethane Coating Systems with and without Top-Layer PDMS Functionalization Example 3 illustrates thermoset polyurethane omniphobic coatings according to the disclosure and including a polyisocyanate thermosetting component, a polyol thermosetting component, and an amino-functional PDMS omniphobic polymer (Samples 3.1-3.6). Example 3 further illustrates comparative thermoset omniphobic coatings including a polyisocyanate thermosetting component and a polyol thermosetting component, but without an amino-functional PDMS omniphobic polymer (Samples 3.7-3.9).

Sample 3.1: 0.7 mL of polyol (MULTRANOL 4011) was dissolved in 1 mL acetone and then to this solution 1.1 mL hexamethylene diisocyanate trimer (HDIT; DESMODUR N 100A) was added and sonicated at room temperature for 1 hr. The resulting solution was then cast on glass slides and left for solvent evaporation. After complete evaporation it was partially cured for 5 min at 120° C. and then allowed to cool down. Then on its top layer an amino-functional PDMS (PDMS-NH2; molecular weight 2K; 25 mg/4 mL solution in acetone) was added with help of syringe. It was then left for solvent evaporation and then cured at 120° C. for 6 hrs in oven.

Sample 3.2: 0.7 mL polyol (MULTRANOL 4011) was dissolved in 1 mL acetone and then to this solution 4 mg nanoclay (dispersed in 0.2 mL acetone) was added and sonicated for 20 min at room temperature. Then to this solution 1.1 mL HDIT (DESMODUR N 100A) was added and vortex ~1 min and then sonicated at room temperature for 1 hr. The resulting solution was then casted on glass slides and left for solvent evaporation. After complete evaporation it was partially cured for 5 min at 120° C. and then allowed to cool down. Then on its top layer PDMS-NH2 (2K) (25 mg/4 mL acetone) was added with help of syringe. It was then left for solvent evaporation and then cured at 120° C. for 6 hrs in oven.

Sample 3.3: 0.7 mL polyol (MULTRANOL 4011) was dissolved in 1 mL acetone and then to this solution 4 mg cellulose nanocrystal (dispersed in 0.2 mL acetone) was added and sonicated for 20 min at room temperature. Then to this solution 1.1 mL HDIT (DESMODUR N 100A) was added and vortex ~1 min and then sonicated at room temperature for 1 hr. The resulting solution was then casted on glass slides and left for solvent evaporation. After complete evaporation it was partially cured for 5 min at 120° C. and then allowed to cool down. Then on its top layer PDMS-NH2 (2K) (25 mg/4 mL acetone) was added with help of syringe. It was then left for solvent evaporation and then cured at 120° C. for 6 hrs in oven.

Sample 3.4: 0.7 mL polyol (MULTRANOL 4011) was dissolved in 1 mL acetone and then to this solution 1.1 mL HDIT (DESMODUR N 100A) was added and sonicated at room temperature for 1 hr. The resulting solution was then cast on glass slides and left for solvent evaporation. After complete evaporation it was partially cured for 5 min at 120° C. and then allowed to cool down. Then on its top layer PDMS-NH2 (2K) (50 mg/4 mL acetone) was added with help of cotton. It was then left for solvent evaporation and then cured at 120° C. for 6 hrs in oven.

Sample 3.5: 0.7 mL polyol (MULTRANOL 4011) was dissolved in 1 mL acetone and then to this solution 4 mg nanoclay (dispersed in 0.2 mL acetone) was added and sonicated for 20 min at room temperature. Then to this solution 1.1 mL HDIT (DESMODUR N 100A) was added and vortex ~1 min and then sonicated at room temperature for 1 hr. The resulting solution was then casted on glass slides and left for solvent evaporation. After complete evaporation it was partially cured for 5 min at 120° C. and then allowed to cool down. Then on its top layer PDMS-NH2 (2K) (50 mg/4 mL acetone) was added with help of cotton. It was then left for solvent evaporation and then cured at 120° C. for 6 hrs in oven.

Sample 3.6: 0.7 mL polyol (MULTRANOL 4011) was dissolved in 1 mL acetone and then to this solution 4 mg cellulose nanocrystal (dispersed in 0.2 mL acetone) was added and sonicated for 20 min at room temperature. Then to this solution 1.1 mL HDIT (DESMODUR N 100A) was added and vortex ~1 min and then sonicated at room temperature for 1 hr. The resulting solution was then casted on glass slides and left for solvent evaporation. After complete evaporation it was partially cured for 5 min at 120° C. and then allowed to cool down. Then on its top layer PDMS-NH2 (2K) (50 mg/4 mL acetone) was added with help of cotton. It was then left for solvent evaporation and then cured at 120° C. for 6 hrs in oven.

Sample 3.7: 0.7 mL polyol (MULTRANOL 4011) was dissolved in 1 mL acetone and then to this solution 1.1 mL HDIT (DESMODUR N 100A) was added and sonicated at room temperature for 1 hr. The resulting solution was then cast on glass slides and left for solvent evaporation. After complete evaporation then it was cured at 120° C. for 6 hrs in oven. (Reference for Samples 3.1 and 3.4)

Sample 3.8: 0.7 mL polyol (MULTRANOL 4011) was dissolved in 1 mL acetone and then to this solution 4 mg nanoclay (dispersed in 0.2 mL acetone) was added and sonicated for 20 min at room temperature. Then to this solution 1.1 mL HDIT (DESMODUR N 100A) was added and vortex ~1 min and then sonicated at room temperature for 1 hr. The resulting solution was then casted on glass slides and left for solvent evaporation. After complete evaporation it was then cured at 120° C. for 6 hrs in oven. (Reference for Samples 3.2 and 3.5)

Sample 3.9: 0.7 mL polyol (MULTRANOL 4011) was dissolved in 1 mL acetone and then to this solution 4 mg cellulose nanocrystal (dispersed in 0.2 mL acetone) was added and sonicated for 20 min at room temperature. Then to this solution 1.1 mL HDIT (DESMODUR N 100A) was added and vortex ~1 min and then sonicated at room temperature for 1 hr. The resulting solution was then casted on glass slides and left for solvent evaporation. After complete evaporation it was then cured at 120° C. for 6 hrs in oven. (Reference for Samples 3.3 and 3.6)

Results: The samples were evaluated for clarity, ink resistance, scratch resistance, contact angles, and sliding angles as generally described above. For Samples 3.1-3.9, the clarity was more than 85% (ranked as 5 on the scale of 1-5, where 5 is best). For Samples 3.1-3.6, the anti-ink is ranked as 5 on the scale of 1-5, where 5 is best). On a scale of 1-5, where 5 is best, the scratch resistance properties for Samples 3.1-3.9 were 5. For Samples 3.1-3.3, on the scale of 1-5, where 5 is best; water and hexadecane repellency were 5, with quantitative data as follows. For Samples 3.1-3.3, water droplets (size 50 um) had sliding angles in the range 17-21±1°. For Samples 3.1-3.3, water contact angle (size 10 um) was in the range 97-102±3°. For Samples 3.1-3.3, hexadecane droplets (size 10 um) had sliding angles in the range 9-11±2°. For Samples 3.1-3.3, hexadecane droplet (size 10 um) contact angle was in the range 38-40±1°. For Samples 3.4-3.6 (cotton application), on the scale of 1-5, where 5 is best, water and hexadecane repellency were 5. For Samples 3.7-3.9 (no PDMS), on the scale of 1-5, where 4 is best, water repellency was 3-4 and hexadecane repellency was 1 (exhibited surface wetting).

Example 4—Polyurethane Coating Systems with In-Situ Mixing of PDMS Functionalization Example 4 illustrates thermoset epoxy omniphobic coatings including a polyisocyanate thermosetting component, a polyol thermosetting component, and an amino-functional PDMS omniphobic polymer, but without first forming a partially crosslinked coating that is subsequently functionalized with the PDMS omniphobic polymer (Samples 4.1-4.3).

Sample 4.1: 0.7 mL polyol (MULTRANOL 4011) was dissolved in 1 mL acetone and then this solution 1.1 mL HDIT (DESMODUR N 100A) was added followed by addition of 5 mg PDMS-NH2 (2K) (dissolved in 0.2 mL acetone) and sonicated at room temperature for 1 hr. The resulting solution was then casted on glass slides and left for solvent evaporation and then cured at 120° C. for 6 hrs in oven.

Sample 4.2: 0.7 mL polyol (MULTRANOL 4011) was dissolved in 1 mL acetone and then this solution 1.1 mL HDIT (DESMODUR N 100A) was added followed by addition of 4 mg of nanoclay (dissolved in 0.2 mL acetone). Then to this solution 5 mg PDMS-NH2 (2K) (dissolved in 0.2 mL acetone) and sonicated at room temperature for 1 hr. The resulting solution was then casted on glass slides and left for solvent evaporation and then cured at 120° C. for 6 hrs in oven.

Sample 4.3: 0.7 mL polyol (MULTRANOL 4011) was dissolved in 1 mL acetone and then this solution 1.1 mL HDIT (DESMODUR N 100A) was added followed by addition of 4 mg of CNC (dissolved in 0.2 mL acetone). Then to this solution 5 mg PDMS-NH2 (2K) (dissolved in 0.2 mL acetone) and sonicated at room temperature for 1 hr. The resulting solution was then casted on glass slides and left for solvent evaporation and then cured at 120° C. for 6 hrs in oven.

Results: The samples were evaluated for clarity, ink resistance, scratch resistance, contact angles, and sliding angles as generally described above. For Samples 4.1-4.3, the clarity was ranked as 3 on the scale of 1-5, where 5 is best. For Samples 4.1-4.3, the anti-ink was ranked as 4 on the scale of 1-5, where 5 is best). On a scale of 1-5, where 5 is best, the scratch resistance properties were 4.5. On the scale of 1-5, where 5 is best; water repellency was 4, and hexadecane repellency was 1 (wetted by the hexadecane). For Samples 4.1-4.3, water droplets (size 75 µL) had sliding angles in the range 28-31±3°. For Samples 4.1-4.3, hexadecane wet these surfaces.

Example 5—Solvent Selection

Example 5 illustrates the effect of various solvents used in epoxy coating systems (Samples 5.1-5.9) and polyurethane coating systems (Samples 5.10-5.15).

Sample 5.1 was prepared as above for Samples 1.1-1.3, but with changing the solvent acetone to 2-Butanone.

Sample 5.2 was prepared as above for Samples 1.1-1.3, but with changing the solvent acetone to acetonitrile.

Sample 5.3 was prepared as above for Samples 1.1-1.3, but with changing the solvent acetone to methanol.

Sample 5.4 was prepared as above for Samples 1.1-1.3, but with changing the solvent acetone to ethanol.

Sample 5.5 was prepared as above for Samples 1.1-1.3, but with changing the solvent acetone to dimethyl carbonate.

Sample 5.6 was prepared as above for Samples 1.1-1.3, but with changing the solvent acetone to THF.

Sample 5.7 was prepared as above for Samples 1.1-1.3, but with changing the top layer solvent acetone to THF.

Sample 5.8 was prepared as above for Samples 1.1-1.3, but with changing the top layer solvent acetone to 2-Butanone.

Sample 5.9 was prepared as above for Samples 1.1-1.3, but with changing the top layer solvent acetone to acetonitrile.

Results: The samples were evaluated for clarity, ink resistance, scratch resistance, contact angles, and sliding angles as generally described above. For Samples 5.1-5.9 (except 5.6-5.7), the clarity was ranked as 3 on the scale of 1-5, where 5 is best. For Samples 5.6-5.7, the clarity was ranked as 5. For Samples 5.1-5.9, the anti-ink resistance was ranked as 5 on the scale of 1-5, where 5 is best). On a scale of 1-5, where 5 is best, the scratch resistance properties were 5 for samples 5.1-5.9. On the scale of 1-5, where 5 is best; Samples 5.6-5.7, ranked as 5 for water and hexadecane repellency. For Samples 5.1-5.5 and 5.8-5.9, they are ranked as 2 for water and hexadecane repellency.

Sample 5.10 was prepared as above for Samples 3.1-3.3, but with changing the solvent acetone to 2-Butanone.

Sample 5.11 was prepared as above for Samples 3.1-3.3, but with changing the solvent acetone to acetonitrile.

Sample 5.12 was prepared as above for Samples 3.1-3.3, but with changing the solvent acetone to THF.

Sample 5.13 was prepared as above for Samples 3.1-3.3, but with changing the top layer solvent acetone to THF.

Sample 5.14 was prepared as above for Samples 3.1-3.3, but with changing the top layer solvent acetone to 2-Butanone.

Sample 5.15 was prepared as above for Samples 3.1-3.3, but with changing the top layer solvent acetone to acetonitrile.

Results: The samples were evaluated for clarity, ink resistance, scratch resistance, contact angles, and sliding angles as generally described above. For Samples 5.10-5.15 (except 5.12 and 5.13), the clarity was ranked as 3 on the scale of 1-5, where 5 is best. For Samples 5.12 and 5.13, the clarity was ranked as 5. For samples 5.10-5.15 the anti-ink resistance was ranked as 5 on the scale of 1-5, where 5 is best). On a scale of 1-5, where 5 is best, the scratch resistance properties were 5 for samples 5.10-5.15. On the scale of 1-5, where 5 is best; Samples 5.12-5.13 ranked as 5 for water and hexadecane repellency. For Samples 5.10-5.11 and 5.14-5.15, they are ranked as 3 for water and 1 for hexadecane repellency.

Example 6—PDMS Molecular Weight

Example 6 illustrates the effect of different PDMS molecular weights used in epoxy coating systems (Samples 6.1-6.3) and polyurethane coating systems (Samples 6.4-6.6).

Samples 6.1-6.3 were prepared as above for Samples 1.1-1.3 (epoxy system), but with changing the PDMS-NH2 (2K molecular weight) to PDMS-NH2 (1K molecular weight).

Samples 6.4-6.6 were prepared as above for Samples 3.1-3.3 (polyurethane system), but with changing the PDMS-NH2 (2K molecular weight) to PDMS-NH2 (1K molecular weight).

Results: The samples were evaluated for clarity, ink resistance, scratch resistance, contact angles, and sliding angles as generally described above. For Samples 6.1-6.3, the clarity was ranked as 5 on the scale of 1-5, where 5 is best. For Samples 6.1-6.3, the anti-ink resistance was ranked as 5 on the scale of 1-5, where 5 is best). On a scale of 1-5, where 5 is best, the scratch resistance properties were 5 for Samples 6.1-6.3. On a scale of 1-5, where 5 is best, Samples 6.1-6.3 ranked as 5 for water repellency (sliding angles: 19-23° (50 µL), contact angles: 96-101° 5 µL). Samples 6.1-6.3 ranked as 5 for hexadecane repellency (sliding angles: 10-11° 10 µL, contact angles: 39-52° 5 µL). For Samples 6.4-6.6, the clarity ranked as 5 on the scale of 1-5, where 5 is best. For Samples 6.4-6.6, the anti-ink resistance ranked as 5 on the scale of 1-5, where 5 is best). On a scale of 1-5, where 5 is best, the scratch resistance properties were 4 for Samples 6.4-6.6. On a scale of 1-5, where 5 is best, Samples 6.4-6.6 ranked as 5 for water repellency. Samples 6.4-6.6 ranked as 5 for hexadecane repellency.

Example 7—Polyurethane Coating Systems with Top-Layer PDMS Functionalization Applied to Large Substrates Example 7 illustrates thermoset polyurethane omniphobic coatings according to the disclosure and including a polyisocyanate thermosetting component (UH80 available from Sherwin-Williams), a polyol thermosetting component (CC939 available from Sherwin-Williams), and an amino-functional PDMS omniphobic polymer in a scaled-up process in which the coatings are applied to large-area substrates of about 15 cm×15 cm (about 6 inch×6 inch) and about 15 cm×30 cm (about 6 inch×12 inch) (Samples 7.1-7.3). An initial base coat or layer of polyurethane is applied with the polyisocyanate thermosetting component and the polyol thermosetting component using a spraying, casting, or drawdown bar method, and then the top layer of the base coat is contacted and functionalized with an amino-functional PDMS omniphobic polymer via dipping (Sample 7.1), spray coating (Sample 7.2), or brush coating (Sample 7.3).

Sample 7.1: In general, a base layer of polyurethane was applied to a large-area substrate with a drawdown bar, and then the coated substrate was dipped in diamino-PDMS solution (i.e., having two amino functional groups per PDMS chain). First, urethane coating solutions were prepared by mixing polyol (CC939; 1 mol) and polyisocyanates (UH80; 1.1 mol). Then the base urethane coating was applied to the substrates from the coating solutions using a drawdown bar method. The films were allowed to air-dry until the films were vitrified (typically for 1 hr at about 20-25° C. or room temperature). Then, these films on the coated substrates were dipped into a diamino-PDMS solution ($NH_2$—PDMS-$NH_2$; MW 2500 g/mol) solution (1 wt. % in hexane) for different time periods ranging from 5 seconds up to 3 minutes dip time. Then, panels were immediately rinsed with pentane to remove an unreacted PDMS chains from the surface. The end films were not only water- and oil-repellent but also very clear and showed good ink-resistant properties.

Sample 7.2: In general, a base layer of polyurethane was applied to a large-area substrate with a drawdown bar, and then the coated substrate was spray coated with an amino-PDMS solution (i.e., having one amino functional group per PDMS chain). First, urethane coating solutions were prepared by mixing polyol (CC939; 1 mol) and polyisocyanates (UH80; 1.1 mol). Then the base urethane coating was applied to the substrates from the coating solutions using a drawdown bar method. The films were allowed to air-dry until the films were vitrified. Then, these films were spray coated with an amino-PDMS solution (PDMS-$NH_2$; MW 2000 g/mol) solution (1-5 wt. % in hexane) until the surfaces of the films were completely covered/wet by the amino-PDMS solution. Then, the panels were immediately rinsed with pentane to remove unreacted PDMS chains from the surface. The films were allowed to air-dry for several hours at about 20-25° C. (room temperature) or in some cases heated at 70° C. to speed the curing process. The end films were not only water- and oil-repellent, but also showed good ink-resistant properties.

Sample 7.3: In general, a base layer of polyurethane was applied to a large-area substrate with a drawdown bar, and then the coated substrate was brush coated with an amino-PDMS solution (i.e., having one amino functional group per PDMS chain). First, urethane coating solutions were prepared by mixing polyol (CC939; 1 mol) and polyisocyanates (UH80; 1.1 mol). Then the base urethane coating was applied to the substrates from the coating solutions using spraying, casting, and drawdown bar methods. The films were allowed to air-dry until the films were vitrified. Then, these films were brush coated with an amino-PDMS solution (PDMS-$NH_2$; MW 2000 g/mol) solution (1-5 wt. % in hexane) until the surfaces of the films were completely covered/wet by the amino-PDMS solution. Then, the panels were immediately rinsed with pentane to remove unreacted PDMS chains from the surface. The films were allowed to air-dry for several hours at about 20-25° C. (room temperature) or in some cases heated at 70° C. to speed the curing process. The end films were not only water- and oil-repellent, but also showed good clarity and ink-resistant properties.

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the compositions, processes, kits, or apparatus are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

What is claimed is:

1. A method for forming an omniphobic coated article, the method comprising:
    applying to a substrate (i) at least one first thermosetting component reactive with a second thermosetting component and a functionalized omniphobic polymer and (ii) at least one second thermosetting component reactive with the first thermosetting component;
    reacting the at least one first thermosetting component with the at least one second thermosetting component (i) at temperature from 20° C. to 150° C. and (ii) for a time from 1 min to 300 min to form a partially crosslinked reaction product comprising (i) at least some covalent bonds between the first thermosetting component and the second thermosetting component, and (ii) at least some unreacted functional groups reactive with the functionalized omniphobic polymer;
    applying to the partially crosslinked reaction product a mixture comprising (i) a solvent and (ii) at least one functionalized omniphobic polymer having a glass transition temperature ($T_g$) of 50° C. or less, the functionalized omniphobic polymer comprising a functional group reactive with the first thermosetting component;
    after applying the functionalized omniphobic polymer to the partially crosslinked reaction product, drying the substrate to remove the solvent; and
    reacting the unreacted functional groups in the partially crosslinked reaction product with the functionalized omniphobic polymer to form a thermoset omniphobic coating on the substrate;
    wherein:
        a further coating is not applied to the thermoset omniphobic coating;
        the thermoset omniphobic coating has a water contact angle in a range from 90° to 120°; and
        the thermoset omniphobic coating has an oil contact angle in a range from 1° to 65° for hexadecane.

2. The method of claim 1, wherein the substrate is selected from the group of metal, plastics, a different thermoset material, glass, wood, fabric, textile, and ceramics.

3. The method of claim 1, wherein applying the first thermosetting component and the second thermosetting component comprises:
    applying to the substrate a mixture comprising (i) the first thermosetting component, (ii) the second thermosetting component, and (iii) optionally a solvent.

4. The method of claim 3, comprising performing one or more of spraying, casting, rolling, and dipping to apply the mixture to the substrate.

5. The method of claim 3, wherein the mixture comprises the solvent.

6. The method of claim 5, further comprising:
    after applying the first thermosetting component and the second thermosetting component to the substrate, drying the substrate to remove the solvent, thereby forming a coating of the first thermosetting component and the second thermosetting component on the substrate.

7. The method of claim 1, further comprising:
    applying to the substrate one or more additives selected from the group consisting of nanoclay, graphene oxide, graphene, silicon dioxide (silica), aluminum oxide, cellulose nanocrystals, carbon nanotubes, titanium dioxide (titania), diatomaceous earth, biocides, pigments, dyes, thermoplastics, and combinations thereof.

8. The method of claim 1, comprising reacting the unreacted functional groups in the partially crosslinked reaction product with the functionalized omniphobic polymer to form a thermoset omniphobic coating on the substrate (i) at a temperature from 20° C. to 180° C. and (ii) for a time from 1 hr to 24 hr.

9. The method of claim 1, wherein:
    the at least one first thermosetting component is applied in an amount ranging from 10 wt. % to 90 wt. % relative to a total weight amount applied of the at least one first thermosetting component, the at least one second thermosetting component, and the at least one functionalized omniphobic polymer;
    the at least one functionalized omniphobic polymer is applied in an amount ranging from 0.01 wt. % to 20 wt. % relative to the total weight amount applied of the at least one first thermosetting component, the at least one second thermosetting component, and the at least one functionalized omniphobic polymer; and
    the at least one second thermosetting component is applied in an amount ranging from 10 wt. % to 90 wt. % relative to total weight amount applied of the at least one first thermosetting component, the at least one second thermosetting component, and the at least one functionalized omniphobic polymer.

10. The method of claim 1, wherein the functional group of the functionalized omniphobic polymer is selected from the group consisting of epoxide groups, amino groups, isocyanate groups, hydroxyl groups, carboxylic groups, and combinations thereof.

11. The method of claim 1, wherein the functionalized omniphobic polymer is selected from the group consisting of functionalized polysiloxanes, functionalized polyperfluoroethers, functionalized polybutadienes, functionalized polyisobutenes, functionalized branched polyolefins, functionalized poly(meth)acrylates, and combinations thereof.

12. The method of claim 1, wherein the functionalized omniphobic polymer comprises a mono-functional functionalized omniphobic polymer.

13. The method of claim 1, wherein the functionalized omniphobic polymer comprises a di-functional functionalized omniphobic polymer.

14. The method of claim 1, wherein the functionalized omniphobic polymer comprises a poly-functional functionalized omniphobic polymer.

15. The method of claim 1, wherein the functionalized omniphobic polymer is a liquid at a temperature in a range from −130° C. to 40° C.

16. The method of claim 1, wherein the functionalized omniphobic polymer has a number-average molecular weight ranging from 300 to 50,000 g/mol.

17. The method of claim 1, wherein:
    the first thermosetting component comprises a polyisocyanate or a polyol; and
    the second thermosetting component comprises the other of the polyisocyanate and the polyol.

18. The method of claim 17, wherein the polyisocyanate is selected from the group consisting of 1,5-naphthylene diisocyanate, 4,4'-diphenylmethane diisocyanate (MDI), hydrogenated MDI, xylene diisocyanate (XDI), tetramethylxylol diisocyanate (TMXDI), 4,4'-diphenyl-dimethyl-methane diisocyanate, di- and tetraalkyl-diphenylmethane diisocyanate, 4,4'-dibenzyl diisocyanate, 1,3-phenylene diisocyanate, 1,4-phenylene diisocyanate, one or more isomers of tolylene diisocyanate (TDI), 1-methyl-2,4-diiso-cyanato-cyclohexane, 1,6-diisocyanato-2,2,4-trimethyl-hexane, 1,6-diisocyanato-2,4,4-trimethylhexane, 1-iso-cyanatomethyl-3-isocyanato-1,5,5-trimethylcyclohexane, chlorinated and brominated diisocyanates, phosphorus-containing diisocyanates, 4,4'-diisocyanatophenyl-perfluoroethane, tetramethoxybutane 1,4-diisocyanate, butane 1,4-diisocyanate, hexane 1,6-diisocyanate (HDI), HDI dimer (HDID), HDI trimer (HDIT), HDI biuret, 1,5-pentamethylene diisocyanate (PDI), PDID (dimer of PDI), PDIT (trimer of PDI), PDI biuret, dicyclohexylmethane diisocyanate, cyclohexane 1,4-diisocyanate, ethylene diisocyanate, phthalic acid bisisocyanatoethyl ester, 1-chloromethylphenyl 2,4-diisocyanate, 1-bromomethylphenyl 2,6-diisocyanate, 3,3-bischloromethyl ether 4,4'-diphenyldiisocyanate, trimethylhexamethylene diisocyanate, 1,4-diisocyanato-butane, 1,2-diisocyanatododecane, and combinations thereof.

19. The method of claim 17, wherein the polyol is selected from the group consisting of polyether polyols, hydroxylated (meth)acrylate oligomers, glycerol, ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, glycerol, trimethylolpropane, 1,2,6-hexanetriol, pentaerythritol, (meth)acrylic polyols, isosorbide, and combinations thereof.

20. The method of claim 1, wherein:
the first thermosetting component comprises a polyisocyanate;
the second thermosetting component comprises a polyol; and
the functional group of the functionalized omniphobic polymer comprises an amino group.

21. The method of claim 1, wherein:
the first thermosetting component comprises a polyepoxide or an amine; and
the second thermosetting component comprises the other of the polyepoxide and the amine.

22. The method of claim 21, wherein the polyepoxide is selected from the group consisting of polyepoxide-substituted aromatic hydrocarbons, aliphatic hydrocarbons, cycloaliphatic hydrocarbons, ethers thereof, esters thereof, imines thereof, and combinations thereof.

23. The method of claim 21, wherein the amine is selected from the group consisting of polyamine-substituted aromatic hydrocarbons, aliphatic hydrocarbons, cycloaliphatic hydrocarbons, ethers thereof, esters thereof, imines thereof, and combinations thereof.

24. The method of claim 1, wherein:
the first thermosetting component comprises an amine;
the second thermosetting component comprises a polyepoxide; and
the functional group of the functionalized omniphobic polymer comprises an isocyanate group.

25. The method of claim 1, the first thermosetting component and the second thermosetting component together correspond to an acrylic thermoset.

26. The method of claim 1, wherein the thermoset omniphobic coating has a water sliding angle in a range from 1° to 30° for a 75 µl droplet.

27. The method of claim 1, wherein the thermoset omniphobic coating has an oil sliding angle in a range from 1° to 20° for a 25 µl hexadecane droplet.

28. The method of claim 1, wherein the thermoset omniphobic coating has a thickness ranging from 0.01 µm to 500 µm.

29. The method of claim 1, wherein:
the thermoset omniphobic coating has a water sliding angle in a range from 1° to 30° for a 75 µl droplet; and
the thermoset omniphobic coating has an oil sliding angle in a range from 1° to 20° for a 25 µl hexadecane droplet.

* * * * *